US009577458B2

(12) United States Patent
Kaita et al.

(10) Patent No.: US 9,577,458 B2
(45) Date of Patent: Feb. 21, 2017

(54) ELECTRICAL STORAGE SYSTEM

(71) Applicants:Keiji Kaita, Miyoshi (JP); Yuji Nishi, Nagoya (JP); Yukinari Tanabe, Nagoya (JP); Hiromasa Tanaka, Okazaki (JP); Motoi Ito, Nagoya (JP)

(72) Inventors: Keiji Kaita, Miyoshi (JP); Yuji Nishi, Nagoya (JP); Yukinari Tanabe, Nagoya (JP); Hiromasa Tanaka, Okazaki (JP); Motoi Ito, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 185 days.

(21) Appl. No.: 14/425,492

(22) PCT Filed: Nov. 27, 2013

(86) PCT No.: PCT/IB2013/002650
§ 371 (c)(1),
(2) Date: Mar. 3, 2015

(87) PCT Pub. No.: WO2014/087211
PCT Pub. Date: Jun. 12, 2014

(65) Prior Publication Data
US 2015/0229154 A1    Aug. 13, 2015

(30) Foreign Application Priority Data

Dec. 3, 2012    (JP) ................. 2012-264010

(51) Int. Cl.
*H02J 7/00*    (2006.01)
*B60L 11/18*    (2006.01)
*H02J 7/34*    (2006.01)

(52) U.S. Cl.
CPC .......... *H02J 7/0072* (2013.01); *B60L 11/1861* (2013.01); *H02J 7/0021* (2013.01);
(Continued)

(58) Field of Classification Search
USPC ......................................... 320/118
See application file for complete search history.

(56) References Cited

U.S. PATENT DOCUMENTS 5,986,865 A  *  11/1999  Umeki ................. H02J 7/0031
                                                                 320/134
7,126,342 B2 *  10/2006  Iwabuchi ......... G01R 19/16542
                                                                 320/116
(Continued)

FOREIGN PATENT DOCUMENTS

EP    2 141 782 A2    1/2010
JP    10-012282 A    1/1998
(Continued)

*Primary Examiner* — Samuel Berhanu
(74) *Attorney, Agent, or Firm* — Sughrue Mion, PLLC

(57) ABSTRACT

An electrical storage system includes: an electrical storage device (10) including serially connected electrical storage blocks; a relay (SMR-B, SMR-G) switching a connection state between the electrical storage device and a load; a controller (30, 34) controlling the relay; and a current interruption circuit (60) interrupting energization of the electrical storage device. The current interruption circuit (60) includes an alarm circuit (63) outputting an alarm signal indicating that any one electrical storage block is overcharged or overdischarged by comparing a voltage value of each electrical storage block with a threshold; a latch circuit (64) retaining the alarm signal; and a transistor (68) causing the relay to switch from an on state to an off state upon reception of a latch circuit output signal. The controller determines an energization state of the electrical storage device after executing control for causing the alarm circuit to output the alarm signal by changing the voltage value or the threshold.

7 Claims, 10 Drawing Sheets

(52) U.S. Cl.
CPC .......... *H02J 7/0026* (2013.01); *H02J 7/0031* (2013.01); *H02J 7/345* (2013.01); *Y02T 10/705* (2013.01); *Y02T 10/7005* (2013.01); *Y02T 10/7011* (2013.01); *Y02T 10/7044* (2013.01); *Y02T 10/7055* (2013.01)

(56) References Cited

U.S. PATENT DOCUMENTS

| | | |
|---|---|---|
| 2013/0241480 A1 | 9/2013 | Kirimoto et al. |
| 2014/0015454 A1 | 1/2014 | Kunimitsu et al. |

FOREIGN PATENT DOCUMENTS

| | | |
|---|---|---|
| JP | 11-098701 A | 4/1999 |
| JP | 11-215716 A | 8/1999 |
| JP | 2007-033108 A | 2/2007 |
| JP | 2008-312396 A | 12/2008 |
| JP | 2009-178014 A | 8/2009 |
| JP | 2010-110156 A | 5/2010 |
| JP | 4533357 B2 | 9/2010 |
| WO | 2011/111350 A1 | 9/2011 |
| WO | 2012/132178 A | 10/2012 |

\* cited by examiner

ELECTRICAL STORAGE SYSTEM

BACKGROUND OF THE INVENTION

1. Field of the Invention

The invention relates to a technique for interrupting energization of an electrical storage device.

2. Description of Related Art

There has been suggested a technique for turning off a system main relay when charging current flows through a secondary battery in order to prevent overcharging of the secondary battery. By turning off the system main relay, it is possible to interrupt connection of the secondary battery with a load, it is possible to stop charging the secondary battery, and it is possible to prevent overcharging of the secondary battery.

On-off control over the system main relay is executed by a central processing unit (CPU) included in an electronic control unit (ECU). The CPU executes not only drive control over the system main relay but also other control, and sometimes changes a program incorporated in the CPU. Here, when the program is changed, it is necessary to check whether drive control over the system main relay, in other words, control for preventing overcharging, is normally executed after the program is changed.

SUMMARY OF THE INVENTION

One aspect of the invention relates to an electrical storage system including: an electrical storage device in which a plurality of electrical storage blocks are connected in series with each other, each of the plurality of electrical storage blocks including at least one electrical storage element configured to be charged or discharged; a relay configured to switch between an on state where the relay connects the electrical storage device to a load and an off state where the relay interrupts connection of the electrical storage device with the load; a controller configured to control the relay so as to cause the relay to switch between the on or off state; and a current interruption circuit configured to interrupt energization of the electrical storage device by causing the relay to switch from the on state to the off state. The current interruption circuit includes an alarm circuit configured to output an alarm signal indicating that at least any one of the electrical storage blocks is in one of an overcharged state or an overdischarged state by comparing an input voltage value of each electrical storage block with a threshold; a latch circuit configured to retain the alarm signal; and a transistor configured to cause the relay to switch from the on state to the off state upon reception of an output signal of the latch circuit. The controller is configured to execute control for causing the alarm circuit to output the alarm signal by changing at least one of the voltage value, input to the alarm circuit, and the threshold, and then determine an energization state of the electrical storage device.

When the electrical storage device is in an energized state after control for outputting the alarm signal is executed, the controller may be configured to determine that the current interruption circuit is in an abnormal state.

When the electrical storage device is in a non-energized state after control for outputting the alarm signal is executed, the controller may be configured to determine that the current interruption circuit is in a normal state.

The controller may be configured to determine the energization state of the electrical storage device using at least one of an output of a voltage sensor configured to detect a voltage value of the electrical storage device and an output of a current sensor configured to detect a current value of the electrical storage device.

The electrical storage system may further include: a plurality of capacitors each connected in parallel with a corresponding one of the electrical storage blocks and each configured to output the voltage value of the corresponding one of the electrical storage blocks to the alarm circuit; a plurality of first switches each of which connects a corresponding one of the electrical storage blocks to a corresponding one of the capacitors; and a plurality of bypass circuits each connected in parallel with a corresponding one of the capacitors and each including a second switch. The controller may be configured to execute control for outputting the alarm signal indicating the overcharged state by charging one of the capacitors using an output of a plurality of the electrical storage blocks through drive control over the first switches and the second switches.

The first switches may be formed of a multiplexer.

The electrical storage system may further include a discharge circuit connected in parallel with the electrical storage blocks via corresponding lines branched off from lines that connect the corresponding electrical storage blocks to the current interruption circuit, and configured to discharge each of the electrical storage blocks by operating a corresponding one third switches. The controller may be configured to execute control for outputting the alarm signal indicating the overdischarged state by decreasing the voltage value input to the alarm circuit by allowing any one of the electrical storage blocks to be discharged to the discharge circuit through drive control over the corresponding third switch of the discharge circuit.

The electrical storage system may further include a plurality of capacitors each connected in parallel with a corresponding one of the electrical storage blocks and each configured to output the voltage value of the corresponding one of the electrical storage blocks to the alarm circuit. The discharge circuit may be connected in parallel with the capacitors.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a first embodiment of the invention will be described.

Figure 1:
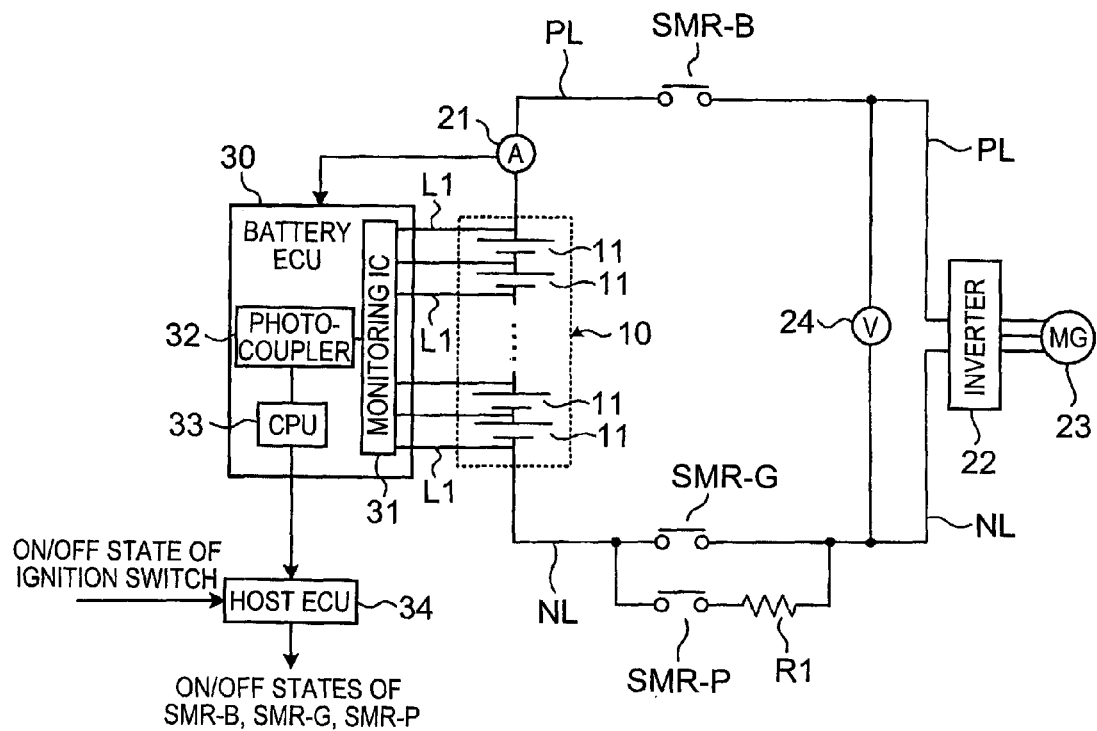
FIG. 1 is a view that shows the configuration of a battery system.

FIG. 1 is a view that shows the configuration of a battery system according to the present embodiment. The battery system shown in FIG. 1 may be, for example, mounted on a vehicle. The vehicle is allowed to travel using an output of a battery pack 10. The invention may be applied to a device other than the vehicle.

The battery pack 10 includes a plurality of single cells (which function as electrical storage elements) 11 that are electrically connected in series with one another. Each single cell 11 may be a secondary battery, such as a nickel metal hydride battery and a lithium ion battery. Instead of the secondary battery, an electric double layer capacitor may be used. The number of the single cells 11 may be set as needed on the basis of a required output, or the like, of the battery pack 10. In the present embodiment, all the single cells 11 that constitute the battery pack 10 are electrically connected in series with one another; instead, the battery pack 10 may include a plurality of the single cells 11 that are electrically connected in parallel with one another.

A current sensor 21 detects a current flowing through the battery pack 10, and outputs the detected result to a battery electronic control unit (ECU) 30. Here, when the battery pack 10 is being discharged, a positive current value is detected by the current sensor 21; whereas, when the battery pack 10 is being charged, a negative current value is detected by the current sensor 21.

In the present embodiment, the current sensor 21 is provided in a positive electrode line PL connected to a positive electrode terminal of the battery pack 10. The current sensor 21 just needs to be able to detect a current flowing through the battery pack 10. The location at which the current sensor 21 is provided may be set as needed. Specifically, the current sensor 21 may be provided in the positive electrode line PL or in a negative electrode line NL connected to a negative electrode terminal of the battery pack 10. A plurality of the current sensors 21 may be used.

A first system main relay SMR-B is provided in the positive electrode line PL. The first system main relay SMR-B switches between an on state and an off state upon reception of a control signal from the host ECU 34. Here, the battery ECU 30 and the host ECU 34 function as a controller.

Figure 2:
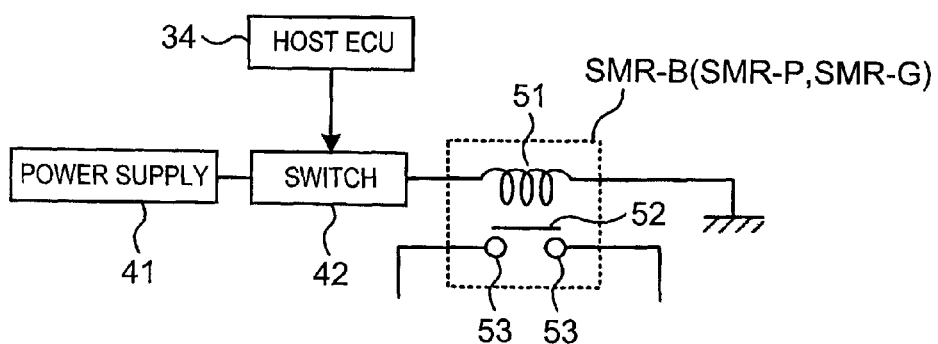
FIG. 2 is a view that shows the structure of each system main relay.

As shown in FIG. 2, the first system main relay SMR-B includes an exciting coil 51, a movable contact 52 and fixed contacts 53. One end of the exciting coil 51 is connected to a power supply 41 via a switch 42, and the other end of the exciting coil 51 is grounded. For example, an auxiliary battery mounted on the vehicle may be used as the power supply 41.

The switch 42 switches between an on state and an off state upon reception of a control signal from the host ECU 34. When the switch 42 switches from the off state to the on state, current flows from the power supply 41 to the exciting coil 51, and magnetic force is generated at the exciting coil 51. On the other hand, when the switch 42 switches from the on state to the off state, energization of the exciting coil 51 from the power supply 41 is interrupted.

The movable contact 52 is, for example, urged by a spring, or the like, in a direction away from the fixed contacts 53. When current flows through the exciting coil 51, the movable contact 52 moves against the urging force due to the magnetic force generated at the exciting coil 51. Thus, the movable contact 52 contacts the fixed contacts 53, and the first system main relay SMR-B switches from the off state to the on state. On the other hand, when energization of the exciting coil 51 is interrupted, the movable contact 52 moves away from the fixed contacts 53 upon reception of the urging force. Thus, the first system main relay SMR-B switches from the on state to the off state.

In FIG. 1, a second system main relay SMR-G is provided in the negative electrode line NL. The second system main relay SMR-G switches between an on state and an off state upon reception of a control signal from the host ECU 34. The structure of the second system main relay SMR-G is similar to the structure of the first system main relay SMR-B (see FIG. 2).

A third system main relay SMR-P and a current limiting resistor R1 are electrically connected in parallel with the second system main relay SMR-G. The third system main relay SMR-P and the current limiting resistor R1 are electrically connected in series with each other. The third system main relay SMR-P switches between an on state and an off state upon reception of a control signal from the host ECU 34. The structure of the third system main relay SMR-P is similar to that of the first system main relay SMR-B (see FIG. 2). The current limiting resistor R1 is used to inhibit flow of inrush current when the battery pack 10 is connected to a load (specifically, an inverter 22 (described later)).

A voltage sensor 24 is connected between the positive electrode line PL and the negative electrode line NL. Specifically, the voltage sensor 24 is connected to the positive electrode line PL that connects the first system main relay SMR-B to the inverter 22 and the negative electrode line NL that connects the second system main relay SMR-G to the inverter 22. The voltage sensor 24 detects a voltage value input to the inverter 22, and outputs the detected result to the battery ECU 30.

The battery pack 10 is connected to the inverter 22 via the positive electrode line PL and the negative electrode line NL. When the battery pack 10 is connected to the inverter 22, the host ECU 34 initially causes the first system main relay SMR-B to switch from the off state to the on state, and causes the third system main relay SMR-P to switch from the off state to the on state. Thus, it is possible to cause current to flow through the current limiting resistor R1.

Subsequently, the host ECU 34 switches the second system main relay SMR-G from the off state to the on state, and then switches the third system main relay SMR-P from the on state to the off state. Thus, connection of the battery pack 10 with the inverter 22 is completed, and the battery system shown in FIG. 1 enters a start-up state (ready-on state). Information about the on/off state of an ignition switch of the vehicle is input to the host ECU 34. When the ignition switch switches from the off state to the on state, the host ECU 34 starts up the battery system shown in FIG. 1.

On the other hand, when the ignition switch switches from the on state to the off state, the host ECU 34 causes the first system main relay SMR-B and the second system main relay SMR-G to switch from the on state to the off state. Thus, electrical connection of the battery pack 10 with the inverter 22 is interrupted, and the battery system shown in FIG. 1 enters a stopped state (ready-off state). When the battery system is in the stopped state, the battery pack 10 is not charged or discharged.

The inverter 22 converts direct-current power, output from the battery pack 10, to alternating-current power, and outputs the alternating-current power to a motor generator (MG) 23. The motor generator 23 generates kinetic energy for propelling the vehicle upon reception of the alternating-current power output from the inverter 22. The kinetic energy generated by the motor generator 23 is transmitted to wheels, and is able to propel the vehicle.

When the vehicle is decelerated or stopped, the motor generator 23 converts kinetic energy, generated at the time of braking the vehicle, to electric energy (alternating-current power). The inverter 22 converts the alternating-current power, generated by the motor generator 23, to direct-current power, and outputs the direct-current power to the battery pack 10. Thus, the battery pack 10 is able to store regenerated electric power.

The battery ECU 30 includes a monitoring integrated circuit (IC) 31. The monitoring IC 31 is connected to the single cells 11 via voltage detection lines L1, and detects the voltage value of each of the single cells 11. Here, any two of the voltage detection lines L1 are connected to a positive electrode terminal and a negative electrode terminal of a corresponding one of the single cells 11.

In the present embodiment, the monitoring IC 31 detects the voltage value of each single cell 11; however, the invention is not limited to this configuration. For example, the monitoring IC 31 is able to detect the voltage value of a battery block (which functions as an electrical storage block) that includes a plurality of the single cells 11. Here, any two of the voltage detection lines L1 are connected to a positive electrode terminal and a negative electrode terminal of a corresponding one of the battery blocks.

Each battery block may be, for example, formed of a plurality of the single cells 11 electrically connected in series with each other. In addition, each battery block may be, for example, formed of a plurality of the single cells 11 electrically connected in parallel with each other. The battery pack 10 may be formed by electrically connecting the plurality of battery blocks in series with one another.

The battery ECU 30 includes a photocoupler 32 and a central processing unit (CPU) 33. An output of the monitoring IC 31 is input to the CPU 33 via the photocoupler 32. Here, by using the photocoupler 32, it is possible to set a circuit located at the input side of the photocoupler 32 and a circuit located at the output side of the photocoupler 32 in an electrically insulated state. The CPU 33 is able to acquire the voltage value of each single cell 11 on the basis of the output of the monitoring IC 31.

The battery ECU 30 (CPU 33) outputs the acquired voltage value of each single cell 11 to the host ECU 34. The host ECU 34 acquires the voltage value of each single cell 11 from the battery ECU 30. Thus, the host ECU 34 is able to control the charging or discharging operation of the battery pack 10 on the basis of the acquired voltage value. The process of controlling the charging or discharging operation of the battery pack 10 will be described later.

In the present embodiment, the battery pack 10 is connected to the inverter 22; however, the invention is not limited to this configuration. Specifically, a step-up circuit may be provided in a current path that connects the battery pack 10 to the inverter 22. The step-up circuit is able to step up the output voltage of the battery pack 10 and output the stepped-up electric power to the inverter 22. The step-up circuit is also able to step down the output voltage of the inverter 22 and output the stepped-down electric power to the battery pack 10.

Figure 3:
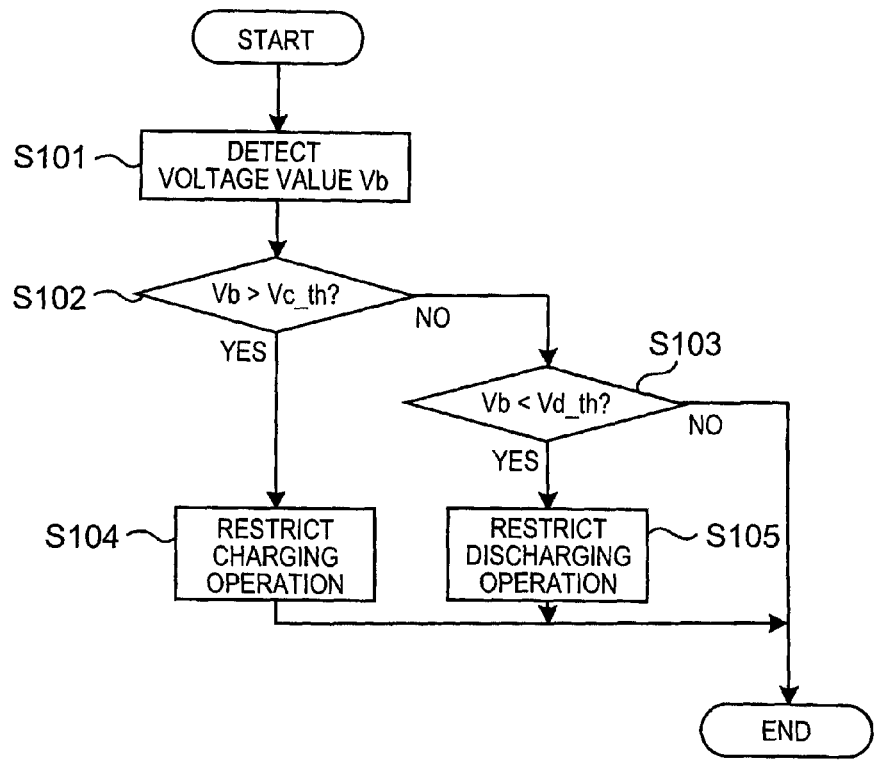
FIG. 3 is a flowchart that shows the process of controlling charging or discharging operation of a battery pack on the basis of a voltage value of each single cell.

Next, one example of the process of controlling the charging or discharging operation of the battery pack 10 on the basis of the voltage value of each single cell 11 will be described with reference to the flowchart shown in FIG. 3. Here, the process shown in FIG. 3 is executed by the host ECU 34. Specifically, the host ECU 34 executes the process shown in FIG. 3 on the basis of a computer program embedded in the host ECU 34. In addition, the process shown in FIG. 3 is repeatedly executed at predetermined intervals.

In step S101, the host ECU 34 acquires a voltage value $V_b$ of each single cell 11. Here, the battery ECU 30 detects the voltage value $V_b$ of each single cell 11 with the use of the monitoring IC 31, and outputs the detected result to the host ECU 34.

In step S102, the host ECU 34 determines whether the voltage value $V_b$ is higher than an upper limit voltage value $V_{c\_th}$. The upper limit voltage value $V_{c\_th}$ is a predetermined voltage value in order to prevent overcharging of each single cell 11. That is, when the voltage value $V_b$ is higher than the upper limit voltage value $V_{c\_th}$, the host ECU 34 is, allowed to determine that the corresponding single cell 11 can reach an overcharged state. In addition, when the voltage value $V_b$ is lower than or equal to the upper limit voltage value $V_{c\_th}$, the host ECU 34 is allowed to determine that the corresponding single cell 11 cannot reach the overcharged state.

Determination as to whether the single cell 11 can reach the overcharged state is desirably carried out before the single cell 11 actually reaches the overcharged state. Therefore, the upper limit voltage value $V_{c\_th}$ may be set to a value lower than the voltage value of the single cell 11, at which the single cell 11 actually becomes the overcharged state. Information about the upper limit voltage value $V_{c\_th}$ may be stored in a memory.

In the present embodiment, the voltage values of the plurality of single cells 11 are detected, and the overcharged state of any one of the single cells 11 is prevented. There may occur variations in self-discharge characteristics or variations in internal resistance among the plurality of single cells 11, and, due to the variations, there may occur variations in voltage value among the plurality of single cells 11. Therefore, when it is determined whether the single cell 11 is in the overcharged state, it is desirable to compare the highest voltage value Vb among the voltage values of the plurality of single cells 11 with the upper limit voltage value Vc_th.

When the voltage value Vb is higher than the upper limit voltage value Vc_th, the host ECU 34 executes the process of step S104. On the other hand, when the voltage value Vb is lower than or equal to the upper limit voltage value Vc_th, the host ECU 34 executes the process of step S103.

In step S103, the host ECU 34 determines whether the voltage value Vb is lower than a lower limit voltage value Vd_th. The lower limit voltage value Vd_th is a predetermined voltage value in order to prevent overdischarging of each single cell 11. That is, when the voltage value Vb is lower than the lower limit voltage value Vd_th, the host ECU 34 is allowed to determine that the single cell 11 can reach an overdischarged state. In addition, when the voltage value Vb is higher than or equal to the lower limit voltage value Vd_th, the host ECU 34 is allowed to determine that the single cell 11 cannot reach the overdischarged state.

Determination as to whether the single cell 11 can reach the overdischarged state is desirably carried out before the single cell 11 actually reaches the overdischarged state. Therefore, the lower limit voltage value Vd_th may be set to a value lower than the voltage value of the single cell 11, at which the single cell 11 actually becomes the overdischarged state. Information about the lower limit voltage value Vd_th may be stored in the memory.

In the present embodiment, the voltage values of the plurality of single cells 11 are detected, and the overdischarged state of any one of the single cells 11 is prevented. As described above, there may occur variations in voltage value among the plurality of single cells 11 due to variations in self-discharge characteristics or variations in internal resistance. Therefore, when it is determined whether the single cell 11 is in the overdischarged state, it is desirable to compare the lowest voltage value Vb among the voltage values of the plurality of single cells 11 with the lower limit voltage value Vd_th.

When the voltage value Vb is lower than the lower limit voltage value Vd_th, the host ECU 34 executes the process of step S105. On the other hand, when the voltage value Vb is higher than or equal to the lower limit voltage value Vd_th, the host ECU 34 ends the process shown in FIG. 3.

In step S104, the host ECU 34 restricts the charging operation of the battery pack 10. Specifically, the host ECU 34 is able to restrict the charging operation of the battery pack 10 by decreasing an upper limit electric power Win at or below which the charging operation of the battery pack 10 is allowed. Here, the host ECU 34 controls the charging operation of the battery pack 10 such that the input electric power (charging electric power) of the battery pack 10 does not exceed the upper limit electric power Win.

The upper limit electric power Win may be preset on the basis of the temperature and state of charge (SOC) of the battery pack 10. Here, the SOC indicates the percentage of a current charge capacity with respect to a full charge capacity. Specifically, the upper limit electric power Win is decreased as the temperature of the battery pack 10 increases or the upper limit electric power Win is decreased as the temperature of the battery pack 10 decreases. In addition, the upper limit electric power Win is decreased as the SOC of the battery pack 10 increases. In the process of step S104, the upper limit electric power Win is decreased below a preset value on the basis of the temperature and SOC of the battery pack 10.

In step S105, the host ECU 34 restricts the discharging operation of the battery pack 10. Specifically, the host ECU 34 is able to restrict the discharging operation of the battery pack 10 by decreasing an upper limit electric power Wout at or below which the discharging operation of the battery pack 10 is allowed. Here, the host ECU 34 controls the discharging operation of the battery pack 10 such that the output electric power (discharging electric power) of the battery pack 10 does not exceed the upper limit electric power Wout.

The upper limit electric power Wout may be preset on the basis of the temperature and SOC of the battery pack 10. Specifically, the upper limit electric power Wout is decreased as the temperature of the battery pack 10 increases or the upper limit electric power Wout is decreased as the temperature of the battery pack 10 decreases. In addition, the upper limit electric power Wout is decreased as the SOC of the battery pack 10 decreases.

In the process of step S105, the upper limit electric power Wout is decreased below a preset value on the basis of the temperature and SOC of the battery pack 10. Restricting the discharging operation of the battery pack 10 includes stopping the discharging operation of the battery pack 10. Here, when the upper limit electric power Wout is set to 0 (kW), it is possible to stop the discharging operation of the battery pack 10.

In the process shown in FIG. 3, the charging or discharging operation of the battery pack 10 is controlled on the basis of the voltage value Vb of each single cell 11; however, the invention is not limited to this configuration. For example, it is applicable that the SOC of the battery pack 10 is calculated and then the charging or discharging operation of the battery pack 10 is controlled on the basis of the calculated SOC. For example, when the vehicle is caused to travel with the use of the battery pack 10 and a power source (such as an engine and a fuel cell) other than the battery pack 10, it is possible to control the charging or discharging operation of the battery pack 10 such that the SOC of the battery pack 10 varies along a reference SOC.

Here, the SOC of the battery pack 10 may be calculated using the voltage value Vb of each single cell 11 and a current value flowing through each single cell 11. There have been suggested various methods of calculating the SOC in the existing art, and these suggestions may be employed as needed. Therefore, the detailed description of the method of calculating the SOC is omitted.

Figure 4:
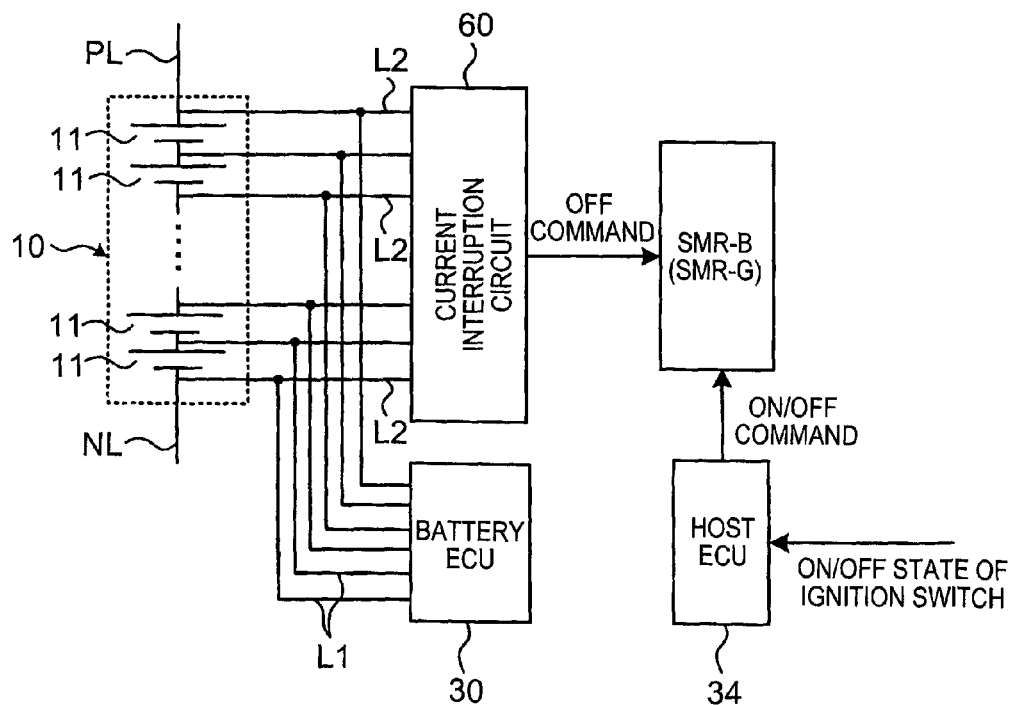
FIG. 4 is a view that shows the configuration of part of a battery system.

As shown in FIG. 4, a current interruption circuit 60 is connected to the battery pack 10 via voltage detection lines L2. Here, each voltage detection line L2 branches off from the corresponding voltage detection line L1, and the number of the voltage detection lines L2 provided is equal to the number of the voltage detection lines L1.

Any two of the plurality of voltage detection lines L2 are connected to the positive electrode terminal and negative electrode terminal of a corresponding one of the single cells 11. The current interruption circuit 60 is able to detect the voltage value of each single cell 11. As described above, when any two of the plurality of voltage detection lines L2 are connected to the positive electrode terminal and negative electrode terminal of a corresponding one of battery blocks, the current interruption circuit 60 is able to detect the voltage value of each battery block with the use of the plurality of voltage detection lines L2.

The current interruption circuit 60 interrupts connection of the battery pack 10 with the inverter 22 when any one of the single cells 11 is in the overcharged state. Specifically, when any one of the single cells 11 is in the overcharged state, the current interruption circuit 60 causes the first system main relay SMR-B and the second system main relay SMR-G to switch from the on state to the off state. Here, it is just required to be able to interrupt connection of the battery pack 10 with the inverter 22, so the current interruption circuit 60 just needs to cause at least one of the first system main relay SMR-B and the second system main relay SMR-G to switch from the on state to the off state.

Specifically, when the voltage value of any one of the single cells 11 is higher than the voltage value corresponding to the overcharged state, the current interruption circuit 60 is able to cause the first system main relay SMR-B and the second system main relay SMR-G to switch from the on state to the off state by interrupting energization of the exciting coils 51.

In the present embodiment, the first system main relay SMR-B and the second system main relay SMR-G switch between the on state and the off state upon reception of commands from the host ECU 34 or switch between the on state and the off state upon reception of commands from the current interruption circuit 60. That is, a command line for causing the first system main relay SMR-B and the second system main relay SMR-G to switch between the on state and the off state includes a command line via the host ECU 34 and a command line via the current interruption circuit 60.

These command lines are independent of each other as shown in FIG. 4. That is, the current interruption circuit 60 is able to cause the first system main relay SMR-B and the second system main relay SMR-G to switch from the on state to the off state irrespective of control executed by the host ECU 34. Here, when the current interruption circuit 60 causes the first system main relay SMR-B and the second system main relay SMR-G to remain in the off state, the host ECU 34 cannot cause the first system main relay SMR-B and the second system main relay SMR-G to switch from the off state to the on state.

Next, the configuration of the current interruption circuit 60 will be described with reference to FIG. 5.

The current interruption circuit 60 includes resistors R2. Each resistor R2 is provided in a corresponding one of the voltage detection lines L2. The resistors R2 are used in order to prevent application of overvoltage from the battery pack 10 (single cells 11) to the current interruption circuit 60. That is, when overvoltage is about to be applied to the current interruption circuit 60, application of overvoltage to the current interruption circuit 60 is prevented through melting of the corresponding resistors R2.

The current interruption circuit 60 includes a plurality of Zener diodes D. Each Zener diode D is electrically connected in parallel with a corresponding one of the single cells 11 via the corresponding two of the voltage detection lines L2. Here, the cathode of each Zener diode D is connected to the positive electrode terminal of the corresponding single cell 11, and the anode of each Zener diode D is connected to the negative electrode terminal of the corresponding single cell 11. The plurality of Zener diodes D are electrically serially connected to one another.

The Zener diodes D are used in order to prevent application of overvoltage from the battery pack 10 (the single cells 11) to the current interruption circuit 60. That is, when overvoltage is about to be applied to the current interruption circuit 60, the corresponding Zener diode D enters a conductive state and is able to flow current from the cathode side to the anode side. Thus, it is possible to prevent application of overvoltage to an integrated circuit (IC) 61 (described later).

When the Zener diode D enters the conductive state, the Zener diode D causes current to flow through the corresponding resistors R2 and is able to melt the resistors R2. That is, when overvoltage is applied from the battery pack 10 to the IC 61, it is possible to interrupt connection of the battery pack 10 with the IC 61 through melting of the resistors R2. Thus, it is possible to protect the IC 61. If application of overvoltage to the current interruption circuit 60 is excluded, the Zener diodes D may be omitted.

The current interruption circuit 60 includes capacitors C. Each capacitor C is electrically connected in parallel with the corresponding single cell 11 via the corresponding two of the voltage detection lines L2. Here, a connection point of each capacitor C with one of the corresponding two voltage detection lines L2 is located between a connection point of the corresponding Zener diode D (cathode) with the one of the corresponding two voltage detection lines L2 and a corresponding one of comparators CMP.

In addition, a connection point of each capacitor C with the other one of the corresponding two voltage detection lines L2 is located between a connection point of the corresponding Zener diode D (anode) with the other one of the corresponding two voltage detection lines L2 and the corresponding one of the comparators CMP. The plurality of capacitors C provided in correspondence with the plurality of single cells 11 are electrically connected in series with one another.

The current interruption circuit 60 includes the IC 61. The IC 61 receives a start-up signal or a stop signal from the battery ECU 30. The start-up signal is a signal for allowing electric power to be supplied from the power supply to the IC 61. The IC 61 is allowed to operate in response to the start-up signal. The stop signal is a signal for stopping supply of electric power from the power supply to the IC 61. The operation of the IC 61 is allowed to be stopped in response to the stop signal.

If the operation of the IC 61 is allowed to be stopped by the battery ECU 30, it is possible to also stop the operation of the IC 61 at the time when the battery system shown in FIG. 1 is stopped. Thus, it is possible to reduce electric power consumed by the IC 61.

The IC 61 includes the comparators CMP. The voltage detection line L2 connected to the positive electrode terminal of each single cell 11 is connected to a negative input terminal of the corresponding comparator CMP. In addition, the voltage detection line L2 connected to the negative electrode terminal of each single cell 11 is connected to a positive input terminal of the corresponding comparator CMP.

Figure 5:
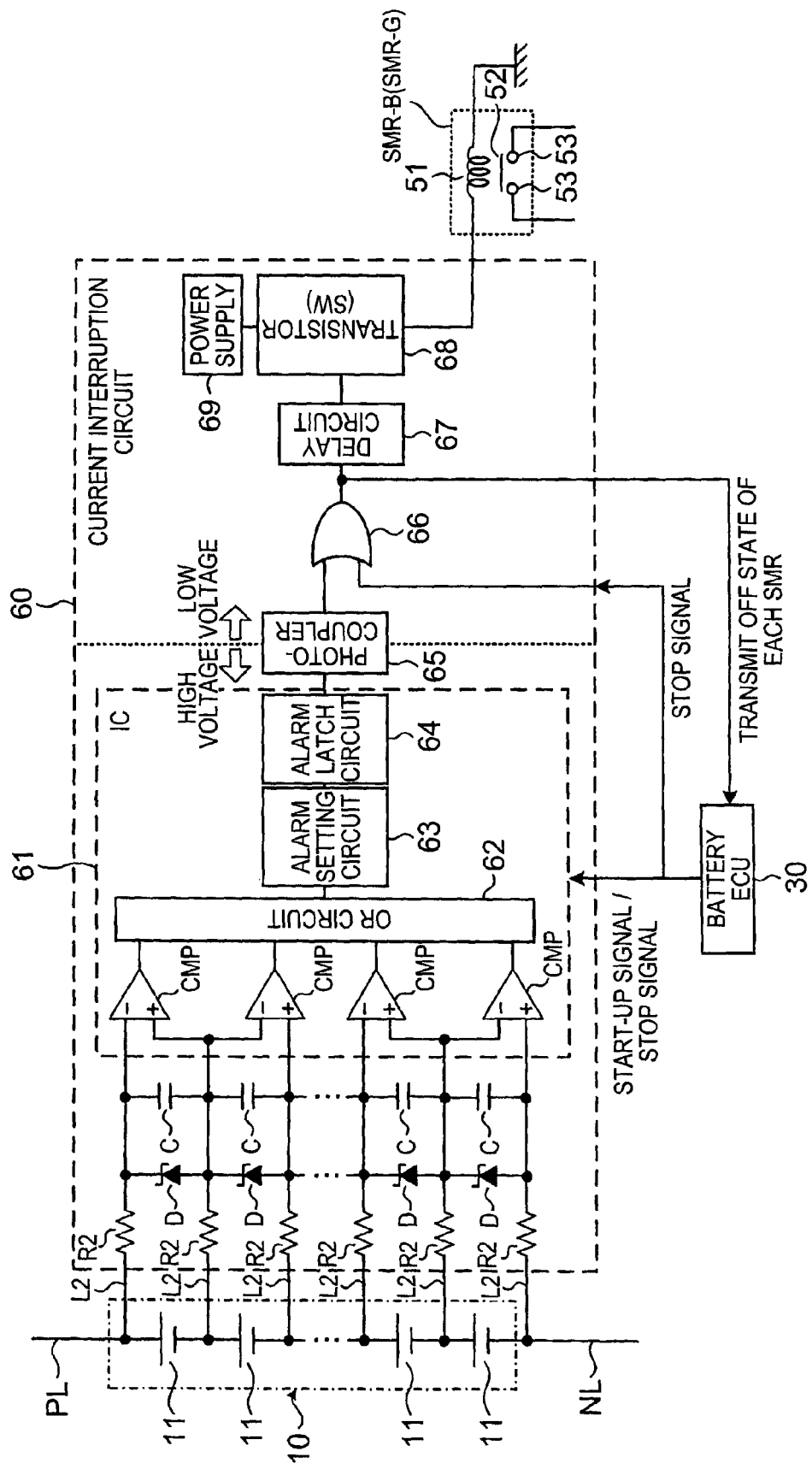
FIG. 5 is a view that shows the configuration of a current interruption circuit.

Here, as shown in FIG. 5, the voltage detection line L2 connected to the positive electrode terminal of one of the adjacent two single cells 11 and the negative electrode terminal of the other one of the adjacent two single cells 11 is branched off. The branched voltage detection lines L2 are respectively connected to the positive input terminal of one of the adjacent two comparators CMP and the negative input terminal of the other one of the adjacent two comparators CMP.

Each comparator CMP outputs a potential difference between the positive electrode terminal and negative electrode terminal of the corresponding single cell 11, in other words, the voltage value of the corresponding single cell 11. In the configuration shown in FIG. 5, each comparator CMP detects the voltage value of the corresponding capacitor C. That is, in the configuration shown in FIG. 5, each capacitor C is charged with electric charge in the corresponding single cell 11, with the result that the voltage value of each capacitor C becomes equal to the voltage value of the corresponding single cell 11. Each comparator CMP detects the voltage value (stabilized voltage value) of the corresponding capacitor C.

The IC 61 includes an OR circuit 62 connected to the comparators CMP. An output signal of each comparator CMP is input to the OR circuit 62. The OR circuit 62 is connected to the plurality of comparators CMP. When the output signal of any one of the comparators CMP is input to the OR circuit 62, the OR circuit 62 generates an output signal.

In the present embodiment, the plurality of comparators CMP operate at mutually different timings. That is, the output signals of the plurality of comparators CMP are input to the OR circuit 62 at mutually different timings. Therefore, each time the voltage value of each single cell 11 is detected, the OR circuit 62 outputs a signal corresponding to the detected voltage value.

The IC 61 includes an alarm setting circuit (which functions as an alarm circuit) 63 connected to the OR circuit 62. The output signal of the OR circuit 62 is input to the alarm setting circuit 63. The alarm setting circuit 63 determines whether any one of the single cells 11 is in the overcharged state, and outputs the alarm signal when any one of the single cells 11 is in the overcharged state. The alarm signal is a signal that indicates that any one of the single cells 11 is in the overcharged state.

Figure 6:
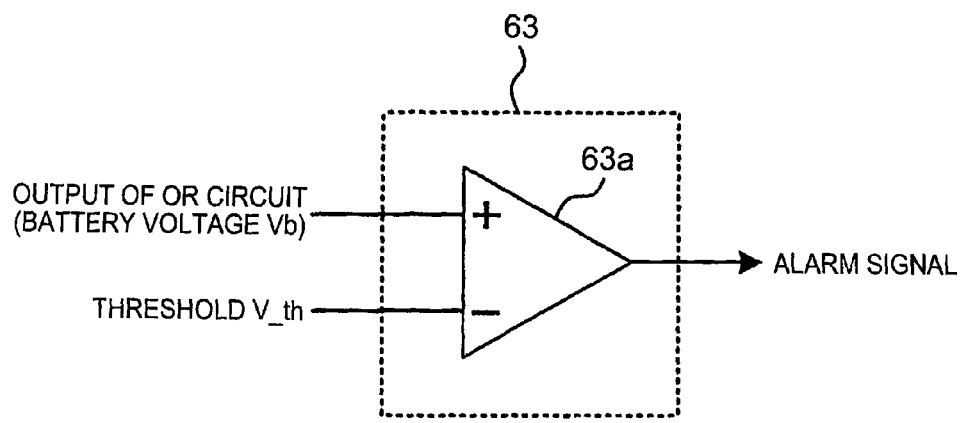
FIG. 6 is a view that shows the configuration of an alarm setting circuit.

Specifically, as shown in FIG. 6, the alarm setting circuit 63 may be formed of a comparator 63a. The output signal of the OR circuit 62 (the voltage value Vb of any one of the single cells 11) is input to a positive input terminal of the comparator 63a. In addition, a threshold (voltage value) V_th is input to a negative input terminal of the comparator 63a.

Here, the threshold (voltage value) V_th is a voltage value for determining whether any one of the single cells 11 is in the overcharged state, and may be set as needed in consideration of, for example, the charging and discharging characteristics of each single cell 11. For example, the threshold (voltage value) V_th may be set to a voltage value at which each single cell 11 actually becomes the overcharged state or may be set to a value lower than the voltage value at which each single cell 11 actually becomes the overcharged state. Here, the threshold (voltage value) V_th may be set to a value higher than the upper limit voltage value Vc_th described in the process of step S102 shown in FIG. 3.

When the output signal of the OR circuit 62 (the voltage value Vb of any one of the single cells 11) is higher than the threshold (voltage value) V_th, the output signal (alarm signal) of the comparator 63a is generated. On the other hand, when the output signal of the OR circuit 62 (the voltage value Vb of each single cell 11) is lower than or equal to the threshold (voltage value) V_th, no output signal (alarm signal) of the comparator 63a is generated.

Figure 7:
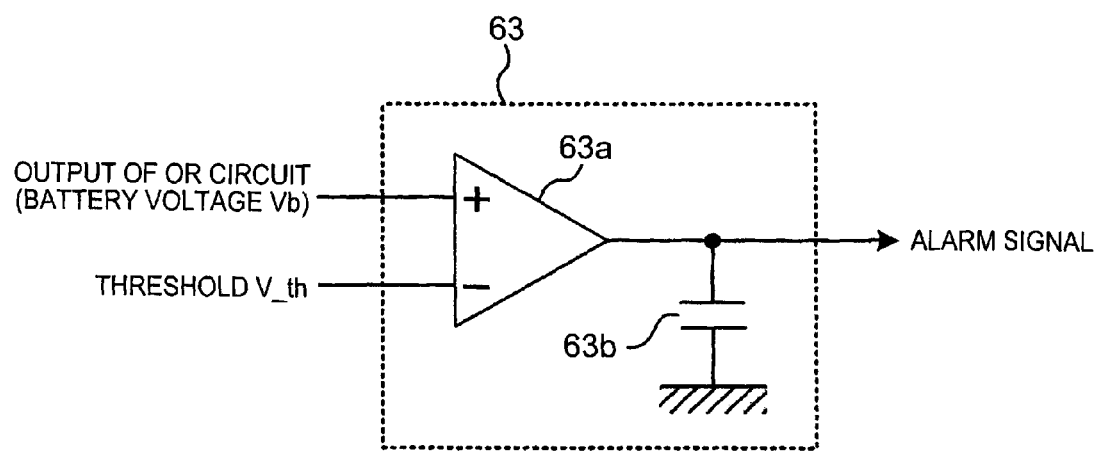
FIG. 7 is a view that shows the configuration of another alarm setting circuit.

On the other hand, the configuration shown in FIG. 7 may be used as the alarm setting circuit 63. In FIG. 7, one end of a capacitor 63b is connected to an output line of the comparator 63a. In addition, the other end of the capacitor 63b is grounded. By providing the capacitor 63b, it is possible to suppress inclusion of noise in the output signal of the alarm setting circuit 63. That is, by removing noise with the use of the capacitor 63b, it is possible to improve the reliability of the output signal (alarm signal) of the alarm setting circuit 63.

In FIG. 5, the IC 61 includes an alarm latch circuit 64 connected to the alarm setting circuit 63. An output signal (alarm signal) of the alarm setting circuit 63 is input to an alarm latch circuit 64. The alarm latch circuit 64 retains an input signal from the alarm setting circuit 63, and outputs a latched signal (corresponding to the alarm signal).

The IC 61 (alarm latch circuit 64) is connected to the photocoupler 65. The photocoupler 65 is used as a switch element, and switches from an off state to an on state upon reception of the latched signal from the alarm latch circuit 64. The photocoupler 65 is an electrically insulating element, so it is possible to electrically insulate a circuit (high voltage circuit) located at the input side of the photocoupler 65 and a circuit (low voltage circuit) located at the output side of the photocoupler 65 from each other. In other words, the photocoupler 65 is able to convert a high voltage signal as an input signal to a low voltage signal as an output signal.

The photocoupler 65 is connected to an input terminal of an OR circuit 66. When the photocoupler 65 switches from the off state to the on state, the output signal of the photocoupler 65 is input to the input terminal of the OR circuit 66. When the output signal of the photocoupler 65 is input to the OR circuit 66, an output signal (corresponding to the alarm signal) of the OR circuit 66 is generated.

In the present embodiment, the photocoupler 65 is provided between the alarm latch circuit 64 and the OR circuit 66; however, the invention is not limited to this configuration. For example, the photocoupler 65 may be provided between the alarm setting circuit 63 and the alarm latch circuit 64.

An output terminal of the OR circuit 66 is connected to a delay circuit 67. The output signal of the OR circuit 66 is input to the delay circuit 67. The delay circuit 67 outputs a signal corresponding to the alarm signal after a predetermined period of time has elapsed from when the output signal of the OR circuit 66 is input. The delay circuit 67 is connected to a transistor (switch) 68. The transistor 68 switches from an on state to an off state upon reception of the output signal of the delay circuit 67. Here, when no output signal of the delay circuit 67 is input to the transistor 68, the transistor 68 is in the on state.

One end of the transistor 68 is connected to a power supply 69. The other end of the transistor 68 is connected to the exciting coil 51 of the first system main relay SMR-B and the exciting coil 51 of the second system main relay SMR-G. The power supply 69 shown in FIG. 5 is the same as the power supply 41 shown in. FIG. 2. In addition, the transistor 68 is the same as the switch 42 shown in FIG. 2. Therefore, the transistor 68 operates upon reception of a control signal from the host ECU 34 or operates upon reception of the output signal of the delay circuit 67.

As described with reference to FIG. 2, when the transistor 68 is in the on state, the first system main relay SMR-B and the second system main relay SMR-G turn on due to the fact that current flows from the power supply 69 to the exciting coils 51. On the other hand, when the transistor 68 is in the off state, supply of current from the power supply 69 to the exciting coils 51 is interrupted, and the first system main relay SMR-B and the second system main relay SMR-G turn off.

According to the present embodiment, when the IC 61 detects the overcharged state of any one of the single cells 11, the output signal (alarm signal) of the IC 61 is input to the transistor 68. Thus, it is possible to cause the first system main relay SMR-B and the second system main relay SMR-G to switch from the on state to the off state. Thus, it is possible to prevent the single cell 11 in the overcharged state from being charged or discharged.

In the present embodiment, the first system main relay SMR-B, the second system main relay SMR-G and the third system main relay SMR-P switch between the on state and the off state upon reception of the control signals from the host ECU 34. On the other hand, when any one of the single cells 11 becomes the overcharged state, not control executed by the host ECU 34 but the current interruption circuit 60 causes the first system main relay SMR-B and the second system main relay SMR-G to switch from the on state to the off state. In this way, drive control over the first system main relay SMR-B and the second system main relay SMR-G is separately executed through a path that includes the host ECU 34 and a path that includes the current interruption circuit 60.

Therefore, even when the design of the host ECU 34 or the design of the battery ECU 30 is changed, the current interruption circuit 60 is not influenced by the design change. In other words, even after the design of the host ECU 34 or the design of the battery ECU 30 is changed, it is allowed to continuously use the current interruption circuit 60. The current interruption circuit 60 is an exclusive component for causing the first system main relay SMR-B and the second system main relay SMR-G to turn off at the time of overcharging of any one of the single cells 11, so it is possible to improve general versatility.

As described above, the current interruption circuit 60 is formed of electronic components (mainly, semiconductor elements), and does not execute process using a computer program. Therefore, when the current interruption circuit 60 is used, it is possible to drive the first system main relay SMR-B and the second system main relay SMR-G without taking a bug of a program into consideration. In addition, normally, abrasion degradation (aged degradation) is hard to occur in semiconductor elements, so it is possible to improve the reliability of the component (current interruption circuit 60) by forming the current interruption circuit 60 from the semiconductor elements.

In the configuration shown in FIG. 5, the single current interruption circuit 60 is provided in correspondence with the battery pack 10; however, the invention is not limited to this configuration. Specifically, when all the single cells 11 that constitute the battery pack 10 are separated into a plurality of groups, the current interruption circuit 60 may be provided in correspondence with each group.

Here, when the current interruption circuit 60 is provided for each group, the circuit located at the output sides of the photocouplers 65 may be shared among the groups. That is, within the current interruption circuit 60 shown in FIG. 5, the circuit located at the input side of the photocoupler 65 (including the photocoupler 65) may be provided in the number of groups. The output signal of each photocoupler 65 may be input to the OR circuit 66.

In the present embodiment, the input terminal of the OR circuit 66 is connected to the battery ECU 30, and the output signal of the battery ECU 30 is input to the input terminal of the OR circuit 66. As described above, the battery ECU 30 outputs the start-up signal or the stop signal to the IC 61. Therefore, the signal for stopping the IC 61 is also input to the OR circuit 66.

When the output signal of the photocoupler 65 is received or the stop signal for stopping the IC 61 is received from the battery ECU 30, the OR circuit 66 generates an output signal. Thus, it is possible to cause the transistor 68 to switch from the on state to the off state, so it is possible to cause the first system main relay SMR-B and the second system main relay SMR-G to switch from the on state to the off state. Here, when no signal is output from the photocoupler 65 to the OR circuit 66 and no stop signal for stopping the IC 61 is output from the battery ECU 30, the OR circuit 66 does not generate an output signal.

As described above, even when the IC 61 outputs no alarm signal, but when the battery ECU 30 outputs the stop signal for stopping the IC 61, it is possible to turn off the first system main relay SMR-B and the second system main relay SMR-G by turning off the transistor 68.

Thus, when the operation of the IC 61 is stopped, it is possible to stop the charging or discharging operation of the battery pack 10 by interrupting connection of the battery pack 10 with the inverter 22. In other words, when the operation of the IC 61 is stopped, it is possible to prevent the battery pack 10 from remaining connected with the inverter 22. Thus, while the IC 61 is not operating, it is possible to prevent the overcharged state of each single cell 11 through the charging or discharging operation of the battery pack 10.

On the other hand, the output signal of the OR circuit 66 is input to not only the delay circuit 67 but also the battery ECU 30. That is, when the alarm signal is output from the IC 61, the information is also transmitted to the battery ECU 30. Thus, the battery ECU 30 is allowed to determine that the first system main relay SMR-B and the second system main relay SMR-G switch from the on state to the off state due to the overcharged state of any one of the single cells 11.

When the vehicle on which the battery system shown in FIG. 1 is mounted includes an engine, the battery ECU 30 is allowed to start the engine upon reception of the output signal (alarm signal) of the OR circuit 66. Specifically, when the output signal (alarm signal) of the OR circuit 66 is input to the battery ECU 30, the battery ECU 30 outputs information, acquired from the OR circuit 66, to the host ECU 34. The host ECU 34 starts the engine upon reception of the information from the battery ECU 30. Here, it is possible to start the engine using the output of the battery pack 10.

When the engine has been already started, it is allowed not to stop the started engine while the output signal (alarm signal) of the OR circuit 66 is input to the battery ECU 30. When there is the output signal (alarm signal) of the OR circuit 66, the first system main relay SMR-B and the second system main relay SMR-G switch from the on state to the off state, and the battery pack 10 is not charged or discharged as described above. In this case, it is possible to ensure travel of the vehicle by not stopping the started engine.

In the present embodiment, the delay circuit 67 is provided between the OR circuit 66 and the transistor 68. Therefore, before the first system main relay SMR-B and the second system main relay SMR-G are caused to switch from the on state to the off state on the basis of the output of the delay circuit 67, it is possible to start the engine by inputting the output signal of the OR circuit 66 to the battery ECU 30. That is, before the charging or discharging operation of the battery pack 10 is stopped, it is possible to cause the engine to be started.

In the configuration that the engine is started using the output electric power of the battery pack 10, if the charging or discharging operation of the battery pack 10 is stopped before the engine is started, it is not possible to start the engine using the output electric power of the battery pack 10. Therefore, in order to ensure travel of the vehicle, it is required to cause the engine to be started before the first system main relay SMR-B and the second system main relay SMR-G are caused to switch from the on state to the off state.

In the present embodiment, it is possible to cause the first system main relay SMR-B and the second system main relay SMR-G to switch from the on state to the off state under the condition that a period of time for starting the engine using the output electric power of the battery pack 10 is ensured with the use of the delay circuit 67. Thus, even when the charging or discharging operation of the battery pack 10 is stopped, it is possible to continuously cause the vehicle to travel with the use of the engine.

When the engine is started with the use of a power supply (for example, auxiliary battery) different from the battery pack 10, the delay circuit 67 may be omitted. When a power supply other than the battery pack 10 is used as the power supply for starting the engine, it is possible to start the engine even after the charging or discharging operation of the battery pack 10 is stopped. In this case, it is not required to delay the timing at which the first system main relay SMR-B and the second system main relay SMR-G are caused to switch from the on state to the off state, so the delay circuit 67 may be omitted.

In the present embodiment, when the alarm signal is output from the alarm setting circuit 63, the alarm signal is retained in the alarm latch circuit 64. That is, after the alarm signal is output from the alarm setting circuit 63, the signal is continuously output from the alarm latch circuit 64, so the first system main relay SMR-B and the second system main relay SMR-G remain in the off state. When the alarm latch circuit 64 is omitted, the alarm signal is output or not output from the alarm setting circuit 63 on the basis of the voltage value of each single cell 11.

Figure 8:
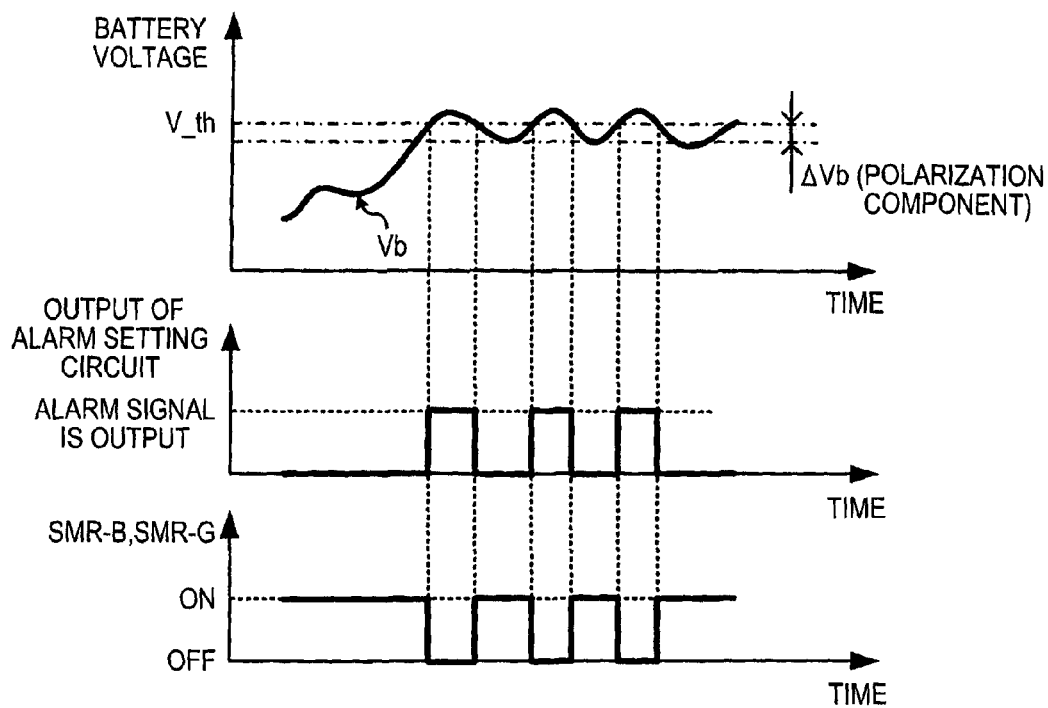
FIG. 8 is a graph that shows an output of the alarm setting circuit and operation of each system main relay in a configuration that no alarm latch circuit is provided.

FIG. 8 is a graph that shows the correlation between an output of the alarm setting circuit 63 and an on/off state of each of the first system main relay SMR-B and the second system main relay SMR-G in the configuration that the alarm latch circuit 64 is omitted.

As shown in FIG. 8, the alarm signal is output from the alarm setting circuit 63 in response to the fact that the voltage value Vb of any one of the single cells 11 reaches the threshold V_th. If the alarm signal is output, the first system main relay SMR-B and the second system main relay SMR-G switch from the on state to the off state. Thus, the battery pack 10 (single cells 11) stops being charged or discharged, and polarization of the battery pack 10 (single cells 11) is eliminated.

When the battery pack 10 (single cells 11) is being charged or discharged, polarization occurs in the battery pack 10, and the voltage value of each single cell 11 varies by a voltage variation caused by the polarization with respect to an open-circuit voltage. When the charging or discharging operation of the battery pack 10 (single cells 11) is stopped, polarization of each single cell 11 is eliminated, and the voltage value Vb of each single cell 11 decreases by a voltage variation (voltage drop) ΔVb corresponding to the polarization. When the polarization is eliminated, the voltage value Vb becomes the open-circuit voltage of each single cell 11.

When the voltage value Vb of each single cell 11 decreases with an elimination of the polarization, the voltage value Vb may decrease below the threshold V_th. Particularly, as the voltage variation ΔVb increases, the voltage value Vb after the polarization has been eliminated tends to decrease below the threshold V_th.

The voltage variation ΔVb is expressed by the product of the current value flowing through the single cell 11 and the internal resistance of the single cell 11. Therefore, as the current value (charging current) flowing through the single cell 11 increases, the voltage variation ΔVb increases. In addition, as the internal resistance of the single cell 11 increases, the voltage variation ΔVb increases. Here, as the temperature of the single cell 11 decreases, the internal resistance of the single cell 11 tends to increase.

When the voltage value Vb of any one of the single cells 11 becomes lower than the threshold V_th with an elimination of the polarization, the alarm signal is output from the alarm setting circuit 63, and the transistor 68 switches from the off state to the on state. Thus, energization of the exciting coils 51 is allowed, and the first system main relay SMR-B and the second system main relay SMR-G switch from the off state to the on state.

If the first system main relay SMR-B and the second system main relay SMR-G switch from the off state to the on state, the battery pack 10 (single cells 11) resumes being charged or discharged, and the voltage value Vb of any one of the single cells 11 may become higher than the threshold V_th again. If the voltage value Vb becomes higher than the threshold V_th, the first system main relay SMR-B and the second system main relay SMR-G are caused to switch from the on state to the off state by the current interruption circuit 60 as described above.

According to the above-described behavior of the voltage value Vb, the first system main, relay SMR-B and the second system main relay SMR-G repeatedly switch between the on state and the off state. In this way, if the first system main relay SMR-B and the second system main relay SMR-G repeatedly switch between the on state and the off state, abrasion degradation of the first system main relay SMR-B and the second system main relay SMR-G is advanced.

Figure 9:
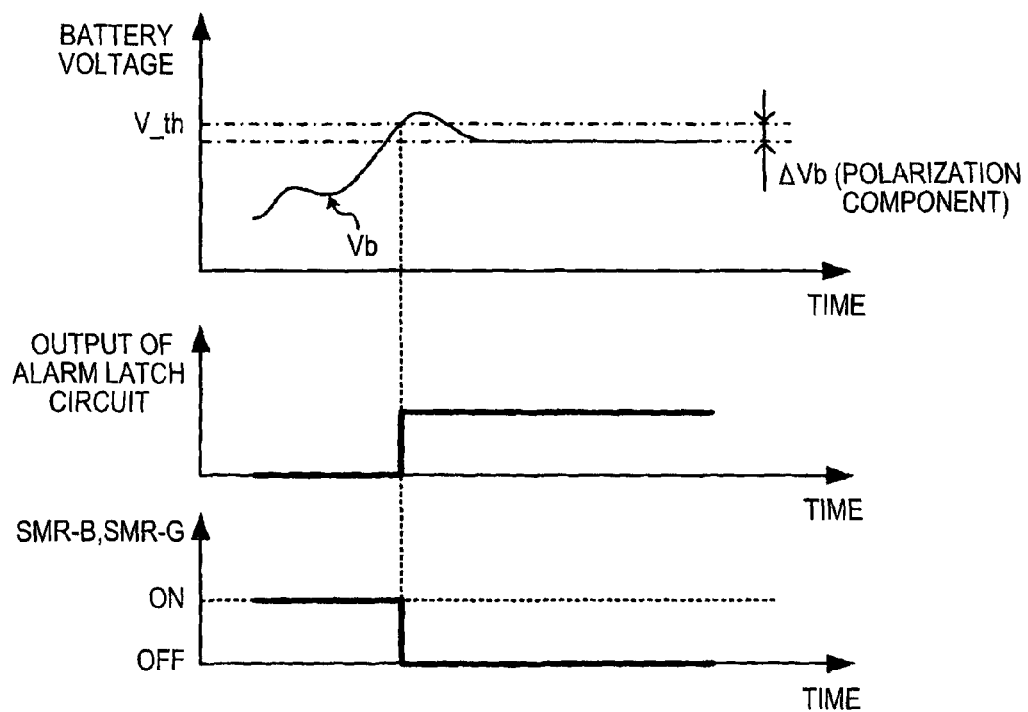
FIG. 9 is a graph that shows an output of the alarm latch circuit and operation of each system main relay in a configuration that the alarm latch circuit is provided.

In the present embodiment, the alarm latch circuit 64 is provided, so, when the alarm signal is output from the alarm setting circuit 63, the alarm signal is retained by the alarm latch circuit 64 as shown in FIG. 9. When the alarm signal is retained, the first system main relay SMR-B and the second system main relay SMR-G remain in the off state.

Thus, it is possible to prevent the first system main relay. SMR-B and the second system main relay SMR-G from repeatedly switching between the on state and the off state due to the behavior of the voltage value Vb, shown in FIG. 8. Here, the first system main relay SMR-B and the second system main relay SMR-G remain in the off state, so the voltage value Vb of each single cell 11 is kept in a state where the voltage value Vb is decreased by the voltage variation ΔVb. In other words, the voltage value Vb of each single cell 11 is kept at the open-circuit voltage.

Figure 10:
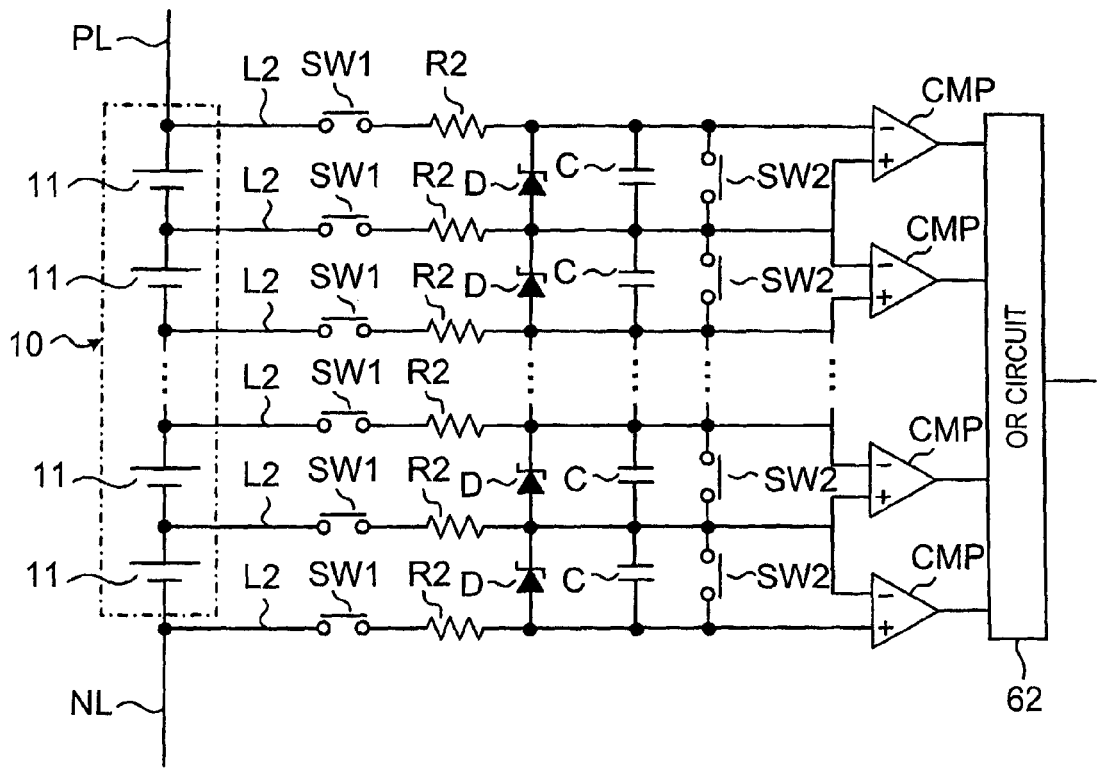
FIG. 10 is a view that shows the configuration of part of the current interruption circuit according to a first embodiment.

Next, a configuration of determining whether the current interruption circuit 60 is in an abnormal state will be described with reference to FIG. 10. FIG. 10 is a view that shows the configuration of part of the current interruption circuit 60. First switches SW1 and second switches SW2 (described later) are added to the configuration shown in FIG. 5 in order to determine whether the current interruption circuit 60 is in the abnormal state. Here, the abnormal state indicates a state where the current interruption circuit 60 is not operating normally.

Each first switch SW1 is provided in a corresponding one of the voltage detection lines L2. Specifically, each first switch SW1 is provided between the electrode terminal (positive electrode terminal or negative electrode terminal) of the corresponding single cell 11 and the corresponding resistor R2. Here, the plurality of first switches SW1 may be formed of a multiplexer. Each first switch SW1 switches between an on state and an off state upon reception of a control signal from the battery ECU 30.

Each second switch SW2 is electrically connected in parallel with the corresponding single cell 11 via the corresponding two voltage detection lines L2. That is, each second switch SW2 is provided in a bypass circuit electrically connected in parallel with the corresponding capacitor C. Each second switch SW2 switches between an on state and an off state upon reception of a control signal from the battery ECU 30.

A connection point of each second switch SW2 with one of the corresponding two voltage detection lines L2 is located between a connection point of the corresponding capacitor C with the one of the corresponding two voltage detection lines L2 and the corresponding comparator CMP. In addition, a connection point of each second switch SW2 with the other one of the corresponding two voltage detection lines L2 is located between a connection point of the corresponding capacitor C with the other one of the corresponding two voltage detection lines L2 and the corresponding comparator CMP.

Figure 11:
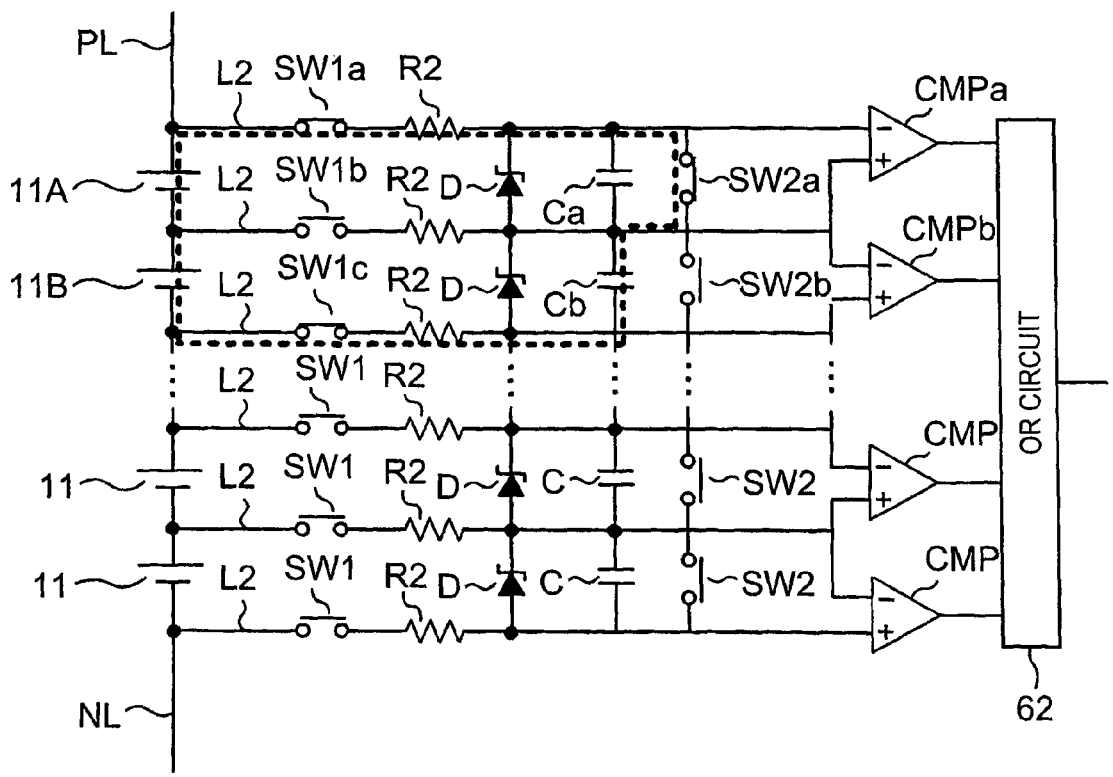
FIG. 11 is a view that shows the configuration of the part of the current interruption circuit according to the first embodiment.

As shown in FIG. 11, when the battery ECU 30 causes only the first switches SW1a, SW1c and the second switch SW2a from the off state to the on state, the capacitor Cb corresponding to the single cell 11B is charged with electric charge in the single cells 11A, 11B along a path indicated by the dashed line in FIG. 11. That is, the voltage value of the capacitor Cb becomes equal to the total of the voltage values of the single cells 11A, 11B. Thus, the comparator CMPb outputs the voltage value of the capacitor Cb.

As described with reference to FIG. 6 or FIG. 7, the alarm setting circuit 63 compares the voltage value of the capacitor Cb with the threshold (voltage value) V_th. Here, the voltage value of the capacitor Cb is not the voltage value of the single cell 11B shown in FIG. 11 but the voltage value of both the single cells 11A, 11B, so the voltage value of the capacitor Cb tends to be higher than the threshold (voltage value) V_th. When the voltage value of the capacitor Cb is higher than the threshold (voltage value) V_th, the alarm setting circuit 63 outputs the alarm signal indicating that the corresponding single cell 11 is in the overcharged state. The alarm signal is used to determine whether the current interruption circuit 60 is in the abnormal state.

When the alarm setting circuit 63 outputs the alarm signal, the first system main relay SMR-B and the second system main relay SMR-G switch from the on state to the off state, and the charging or discharging operation of the battery pack 10 is stopped as described above. When the charging or discharging operation of the battery pack 10 is stopped, the voltage value input to the inverter 22 becomes 0 (V) or the current value flowing through the battery pack 10 becomes 0 (A).

In the example shown in FIG. 11, the capacitor Cb is configured to output a voltage equal to the total of the voltage values of the two single cells 11A, 11B; however, the invention is not limited to this configuration. That is, it is applicable that, when the single capacitor C is charged with electric charge in the three or more single cells 11 electrically connected in series with one another, the single capacitor C may be configured to output a voltage value equal to the total of the voltage values of the three or more single cells 11. When the single capacitor C is charged with electric charge in the three or more single cells 11 as well, the on/off state of each of the first switches SW1 and the second switches SW2 just needs to be controlled as in the case of the example shown in FIG. 11.

Here, the number of the single cells 11 by which each capacitor C is charged with electric charge may be set as needed in consideration of the withstanding voltage of each capacitor C. That is, the number of the single cells 11 may be set such that the voltage value of a plurality of the single cells 11 by which each capacitor C is charged with electric charge does not exceed the withstanding voltage of each capacitor C.

After the battery pack 10 is discharged, the voltage value of each single cell 11 is decreased, so the number of the single cells 11 by which each capacitor C is charged with electric charge may be set on the basis of the voltage value of each single cell 11, detected by the battery ECU 30. Specifically, as the voltage value of each single cell 11 decreases, the number of the single cells 11 by which the single capacitor C is charged with electric charge may be increased. Thus, it is possible to set the voltage value input to the alarm setting circuit 63 such that the input voltage value is higher than the threshold (voltage value) V_th, so it is possible to cause the alarm setting circuit 63 to output the alarm signal.

Figure 12:
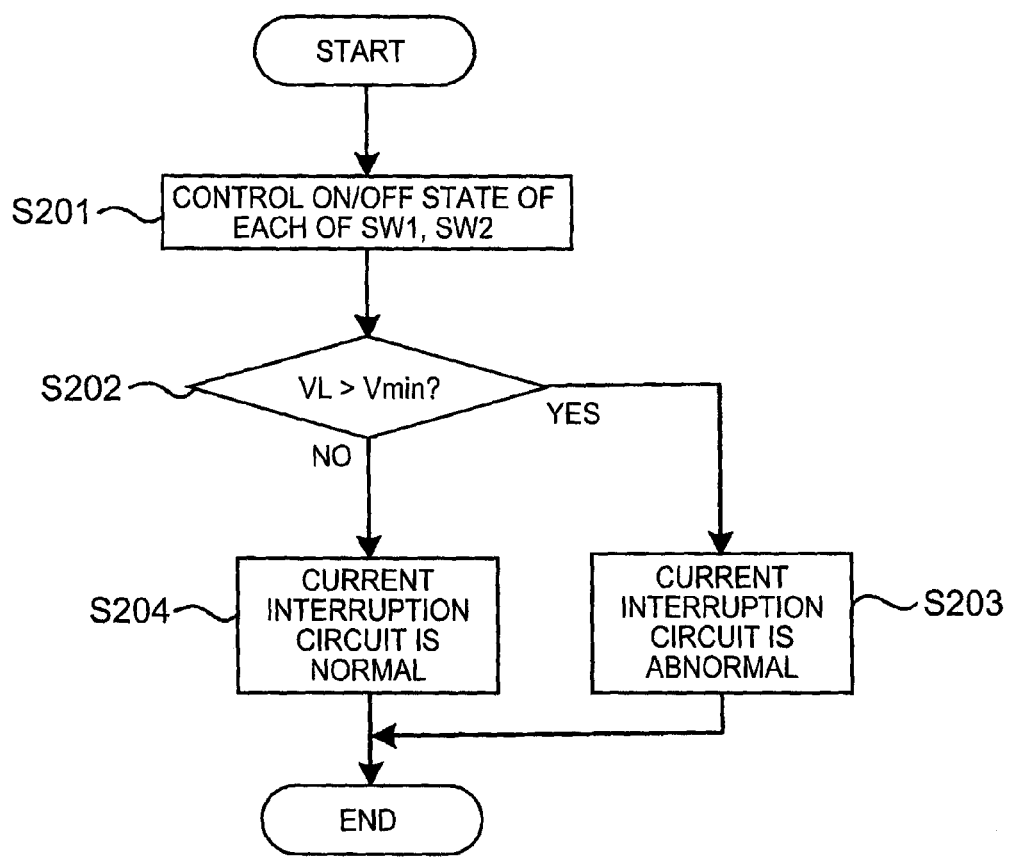
FIG. 12 is a flowchart that shows the process of determining whether the current interruption circuit is in an abnormal state according to the first embodiment.

Next, the process of determining whether the current interruption circuit 60 is in the abnormal state will be described with reference to the flowchart shown in FIG. 12. The process shown in FIG. 12 is executed by the battery ECU 30.

In step S201, the battery ECU 30 controls the on/off state of each of the plurality of first switches SW1 and second switches SW2 shown in FIG. 10. For example, as shown in FIG. 11, when the capacitor Cb is charged with electric charge in the two single cells 11A, 11B, the battery ECU 30 causes only the first switches SW1a, SW1c and the second switch SW2a to switch from the off state to the on state. Here, the first switches SW1 and the second switches SW2 other than the first switches SW1a, SW1c and the second switch SW2a are caused to remain in the off state.

When the process of step S201 is executed, as described with reference to FIG. 11, the voltage value of the capacitor Cb becomes equal to the voltage value of both the single cells 11A, 11B, and becomes higher than the threshold (voltage value) V_th that is compared in the alarm setting circuit 63. Thus, the alarm setting circuit 63 outputs the alarm signal, and causes the first system main relay SMR-B and the second system main relay SMR-G to switch from the on state to the off state. Accordingly, the charging or discharging operation of the battery pack 10 is stopped.

In step S202, the battery ECU 30 detects the voltage value VL input to the inverter 22 with the use of the voltage sensor 24. The battery ECU 30 determines whether the voltage value VL is higher than the threshold (voltage value) Vmin. The threshold Vmin is a value for determining whether the charging or discharging operation of the battery pack 10 is stopped. Information about the threshold Vmin may be stored in the memory.

The charging or discharging operation of the battery pack 10 is stopped through the process of step S201, so the voltage value input to the inverter 22 is 0 (V). Therefore, the threshold Vmin may be, for example, set to 0 (V). The threshold Vmin may be set to a value higher than 0 (V) in consideration of a detection error of the voltage sensor 24.

When the voltage value VL is higher than the threshold Vmin in step S202, the battery ECU 30 executes the process of step S203. On the other hand, when the voltage value VL is lower than or equal to the threshold Vmin, the battery ECU 30 executes the process of step S204.

In step S203, the battery ECU 30 determines that the current interruption circuit 60 is in the abnormal state. When the current interruption circuit 60 is operating normally, the alarm signal is output from the alarm setting circuit 63, and the charging or discharging operation of the battery pack 10 is stopped as described above.

On the other hand, when the current interruption circuit 60 is in the abnormal state, the alarm setting circuit 63 may not be caused to output the alarm signal or the output signal of the alarm latch circuit 64 may not be input to the transistor 68. In this case, the first system main relay SMR-B and the second system main relay SMR-G do not switch from the on state to the off state, and the charging or discharging operation of the battery pack 10 is continued.

When the charging or discharging operation of the battery pack 10 is continued, the voltage value VL becomes higher than the threshold Vmin. In this case, the battery ECU 30 is allowed to determine that the charging or discharging operation of the battery pack 10 is not stopped irrespective of a situation that control for intentionally outputting the alarm signal is being executed. Thus, the battery ECU 30 is allowed to determine that the current interruption circuit 60 is in the abnormal state.

In step S204, the battery ECU 30 determines that the current interruption circuit 60 is in a normal state. When the voltage value VL is lower than or equal to the threshold Vmin, the charging or discharging operation of the battery pack 10 is stopped, so the battery ECU 30 is allowed to determine that the current interruption circuit 60 is operating normally. That is, the battery ECU 30 is allowed to determine that the first system main relay SMR-B and the second system main relay SMR-G are caused to switch from the on state to the off state in response to the intentionally generated alarm signal.

In the process shown in FIG. 12, it is determined whether the current interruption circuit 60 is in the abnormal state on the basis of the output of the voltage sensor 24; however, the invention is not limited to this configuration. As described above, when the first system main relay SMR-B and the second system main relay SMR-G switch from the on state to the off state in response to the alarm signal output from the current interruption circuit 60, no current flows through the battery pack 10. Therefore, it is possible to determine whether the current interruption circuit 60 is in the abnormal state on the basis of the output signal of the current sensor 21.

Figure 13:
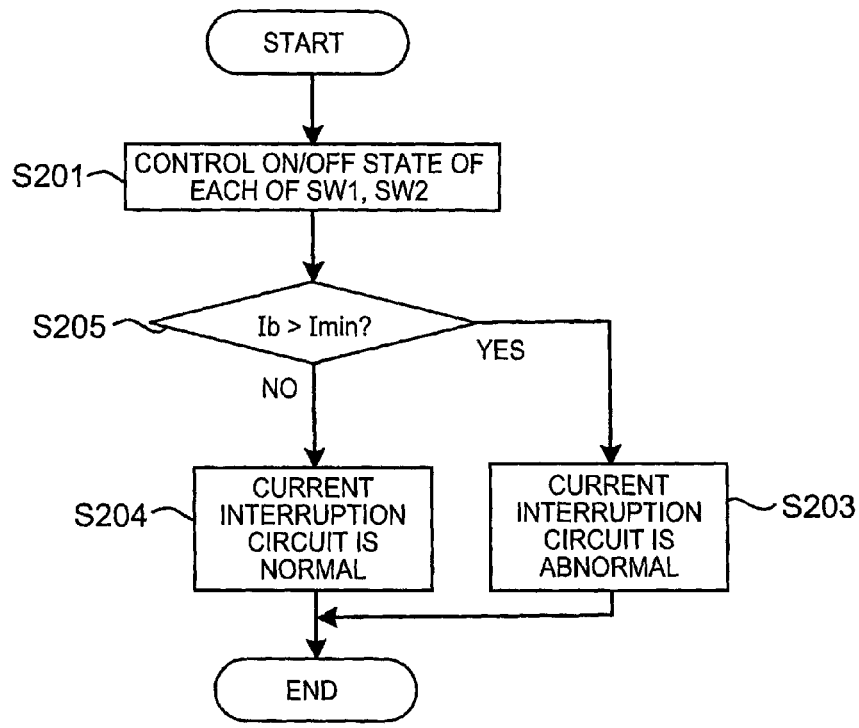
FIG. 13 is a flowchart that shows the process of determining whether the current interruption circuit is in an abnormal state according to an alternative embodiment to the first embodiment.

Specifically, by executing the process shown in FIG. 13, it is possible to determine whether the current interruption circuit 60 is in the abnormal state. In FIG. 13, like reference numerals denote the same processes as those described in FIG. 12. In the processes shown in FIG. 13, the process of step S205 is executed instead of the process of step S202 shown in FIG. 12.

In step S205, the battery ECU 30 detects the current value Ib flowing through the battery pack 10 with the use of the current sensor 21. The battery ECU 30 determines whether the current value Ib is larger than a threshold Imin. The threshold Imin is a value for determining whether the charging or discharging operation of the battery pack 10 is stopped. Information about the threshold Imin may be stored in the memory.

The charging or discharging operation of the battery pack 10 is stopped through the process of step S201, so no current flows through the battery pack 10. Therefore, the threshold Imin may be, for example, set to 0 (A). The threshold Imin may be set to a value different from 0 (A) in consideration of a detection error of the current sensor 21.

As described above, when the battery pack 10 is being discharged, the current value Ib detected by the current sensor 21 is a positive value; whereas, when the battery pack 10 is being charged, the current value Ib detected by the current sensor 21 is a negative value. Therefore, in the process of step S205, when the current value Ib is compared with the threshold Imin, the absolute values of these values are desirably compared with each other.

When the current value Ib is larger than the threshold Imin in step S205, the battery ECU 30 executes the process of step S203. On the other hand, when the current value Ib is smaller than or equal to the threshold Imin, the battery ECU 30 executes the process of step S204.

In the present embodiment, by controlling the on/off state of each of the first switches SW1 and the second switches SW2 shown in FIG. 10, the alarm setting circuit 63 is caused to determine that there is overcharging; however, the invention is not limited to this configuration. Specifically, in the alarm setting circuit 63 shown in FIG. 6 or FIG. 7, by changing a reference voltage (threshold V_th) input to the comparator 63a, the alarm setting circuit 63 may be caused to determine that there is overcharging.

Figure 14:
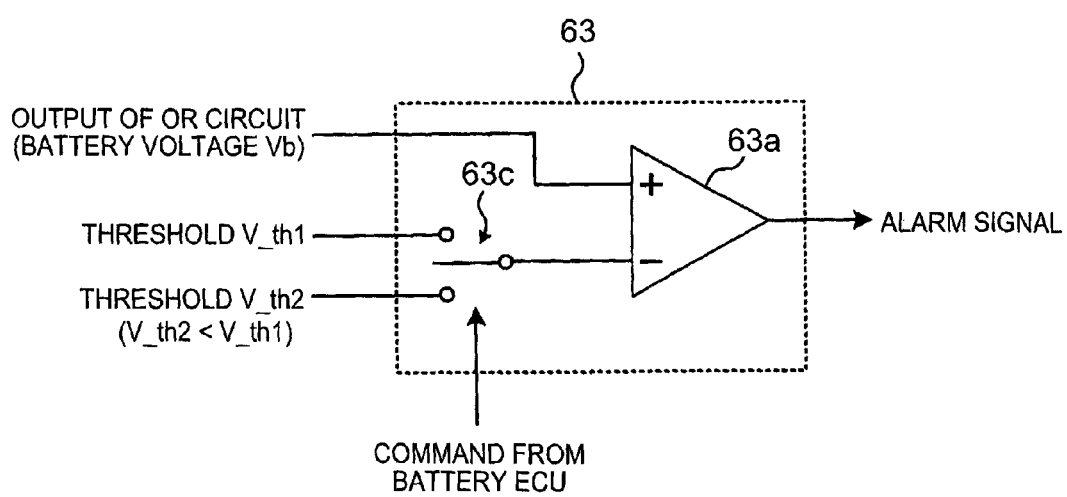
FIG. 14 is a view that shows the configuration of an alarm setting circuit according to an alternative embodiment to the first embodiment.

Specifically, as shown in FIG. 14, a switch 63c is connected to the negative input terminal of the comparator 63a, and it is possible to change the reference voltage input to the comparator 63a by switching the switch 63c. Specifically, a threshold V_th1 or a threshold V_th2 may be input to the comparator 63a as the reference voltage.

The battery ECU 30 is able to execute drive control over the switch 63c. The threshold V_th1 is used to determine whether any one of the single cells 11 is in the overcharged state. That is, the threshold V_th1 is the same as the threshold V_th shown in FIG. 6 or FIG. 7. When it is determined whether any one of the single cells 11 is in the overcharged state with the use of the current interruption circuit 60 while the battery pack 10 is being charged or discharged, the battery ECU 30 executes drive control over the switch 63c and causes the threshold V_th1 to be input to the comparator 63a.

On the other hand, the threshold V_th2 is used to determine whether the current interruption circuit 60 is in the abnormal state. The threshold V_th2 is a value lower than the threshold V_th1. When it is determined whether the current interruption circuit 60 is in the abnormal state, the battery ECU 30 executes drive control over the switch 63c and causes the threshold V_th2 to be input to the comparator 63a.

Because the threshold V_th2 is lower than the threshold V_th1, the voltage value Vb of any one of the single cells 11, input to the comparator 63a, tends to be higher than the threshold V_th2. Therefore, when the threshold V_th2 is input to the comparator 63a, the alarm signal is output from the alarm setting circuit 63. It is possible to cause the first system main relay SMR-B and the second system main relay SMR-G to switch from the on state to the off state in response to the alarm signal, and it is possible to determine whether the current interruption circuit 60 is in the abnormal state through the process shown in FIG. 12 or FIG. 13.

In the configuration shown in FIG. 14, the reference voltage input to the comparator 63a is changed; however, the invention is not limited to this configuration. Specifically, as shown in FIG. 15, a voltage value input to the positive input terminal of the comparator 63a may be changed without changing the reference voltage (threshold V_th) input to the negative input terminal of the comparator 63a.

Figure 15:
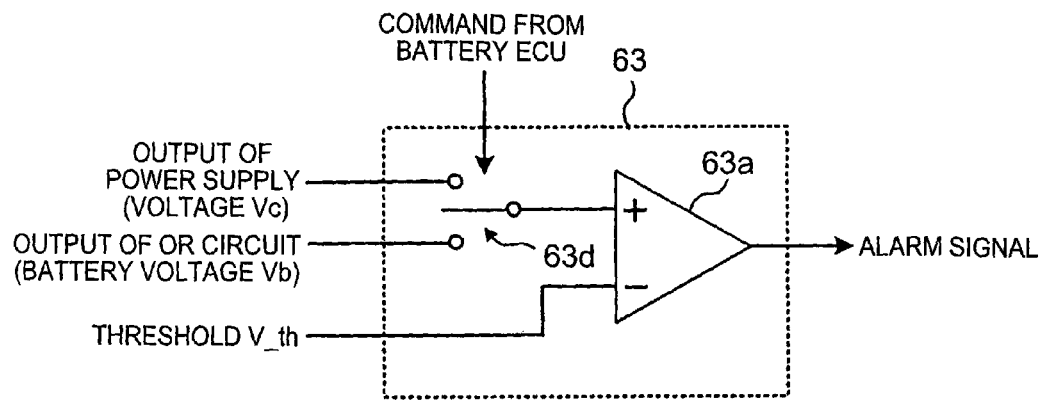
FIG. 15 is a view that shows the configuration of an alarm setting circuit according to another alternative embodiment to the first embodiment.

In the configuration shown in FIG. 15, a switch 63d is connected to the positive input terminal of the comparator 63a. The switch 63d operates upon reception of a control signal from the battery ECU 30. The switch 63d inputs the voltage value Vb of any one of the single cells 11 to the comparator 63a or inputs a voltage value Vc from a power supply to the comparator 63a. The power supply may be, for example, a stabilized power supply.

The voltage value Vc is a value higher than the threshold V_th, and may be set as needed. When the voltage value Vc is input to the comparator 63a, the voltage value Vc is higher than the threshold V_th, so the alarm setting circuit 63 outputs the alarm signal. Thus, when it is determined whether the current interruption circuit 60 is in the abnormal state, the battery ECU 30 is able to cause the voltage value Vc to be input to the comparator 63a by executing drive control over the switch 63d. Through the process shown in FIG. 12 or FIG. 13, it is possible to determine whether the current interruption circuit 60 is in the abnormal state.

When the current interruption circuit 60 determines whether any one of the single cells 11 is in the overcharged state while the battery pack 10 is being charged or discharged, the battery ECU 30 is able to cause the voltage value Vb of the any one of the single cells 11 to be input to the comparator 63a by executing drive control over the switch 63d. Thus, when any one of the single cells 11 is in the overcharged state, it is possible to cause the first system main relay SMR-B and the second system main relay SMR-G to switch from the on state to the off state in response to the alarm signal output from the current interruption circuit 60.

According to the present embodiment, even when each single cell 11 is not in the overcharged state, it is possible to cause the current interruption circuit 60 to determine that any one of the single cells 11 is in the overcharged state on the basis of a command output from the battery ECU 30. In other words, even when each single cell 11 is not in the overcharged state, it is possible to cause the current interruption circuit 60 to output the alarm signal. Thus, it is possible to check whether the alarm signal is normally output from the current interruption circuit 60, and it is possible to determine whether the current interruption circuit 60 is in the abnormal state.

A second embodiment of the invention will be described. In the present embodiment, like reference numerals denote the same components as those described in the first embodiment, and the detailed description is omitted. Hereinafter, the difference from the first embodiment will be mainly described.

In the first embodiment, by causing the alarm setting circuit 63 to determine that there is overcharging, the alarm signal is output, and the first system main relay SMR-B and the second system main relay SMR-G are caused to switch from the on state to the off state. In the present embodiment, by causing the alarm setting circuit 63 to determine that there is overdischarging, the alarm signal is output, and the first system main relay SMR-B and the second system main relay SMR-G are caused to switch from the on state to the off state.

Figure 16:
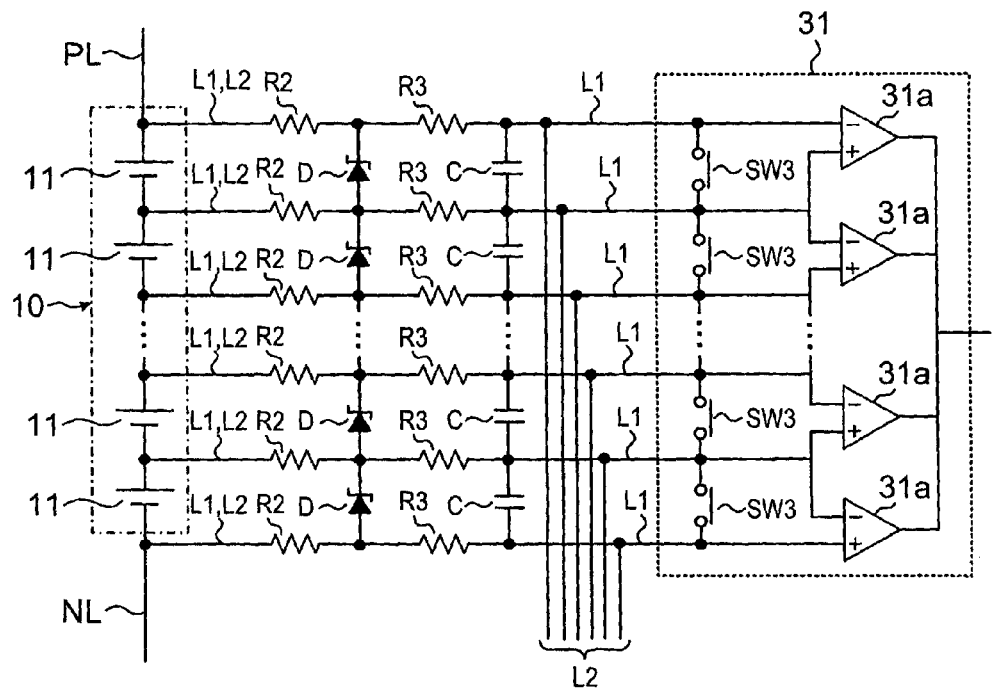
FIG. 16 is a view that shows the configuration of part of a battery ECU according to a second embodiment.

FIG. 16 is a view that shows the configuration of part of the battery ECU 30 according to the present embodiment. As shown in FIG. 16, part of each of the voltage detection lines L1 also serves as part of a corresponding one of the voltage detection lines L2 (a portion indicated by L1, L2), and the resistor R2, the Zener diode D and the capacitor C shown in FIG. 5 are connected to each voltage detection line L1. Here, as shown in FIG. 16, a branching portion of each pair of voltage detection lines L1, L2 is located between the corresponding capacitor C and the monitoring IC 31.

On the other hand, in the configuration shown in FIG. 16, a resistor R3 is provided in each pair of voltage detection lines L1, L2 in addition to the configuration shown in FIG. 5. Specifically, each resistor R3 is provided between a connection point of the diode D with the corresponding pair of voltage detection lines L1, L2 and a connection point of the corresponding capacitor C with the corresponding pair of voltage detection lines L1, L2.

The resistors R2, R3 are electrically connected in series with each other. The resistance value of each resistor R3 is larger than the resistance value of each resistor R2. Each resistor R3 is used to equalize the voltage values of the plurality of single cells 11. Equalizing the voltage values of the plurality of single cells 11 is termed equalizing process.

There may occur variations in self-discharge characteristics or variations in internal resistance among the plurality of single cells 11 that constitute the battery pack 10, and, due to the variations, there occur variations in voltage value among the plurality of single cells 11. When there are variations in voltage value among the plurality of single cells 11, it is not possible to efficiently charge or discharge all the single cells 11. Therefore, it is desirable to uniform the voltage values of the plurality of single cells 11. Here, when the equalizing process is executed, it is possible to suppress variations in voltage value among the plurality of single cells 11.

For example, when the voltage value of any one of the single cells 11 is higher than the voltage values of the other single cells 11, it is possible to discharge only the any one of the single cells 11 by executing the equalizing process. Here, it is possible to allow the discharging current of the any one of the single cells 11 to flow through the corresponding resistor R3. When only the any one of the single cells 11 is discharged, it is possible to equalize the voltage value of the any one of the single cells 11 to the voltage values of the other single cells 11.

The monitoring IC 31 includes a plurality of third switches SW3. The number of the third switches SW3 is equal to the number of the single cells 11. Each third switch SW3 is connected to the corresponding two voltage detection lines L1 connected to the electrode terminals (positive electrode terminal and negative electrode terminal) of a corresponding one of the single cells 11. In addition, each third switch SW3 is provided in a bypass circuit electrically connected in parallel with the corresponding capacitor C. Each third switch SW3 switches between an on state and an off state upon reception of a control signal from the CPU 33 (see FIG. 1).

The third switches SW3 are used to execute the above-described equalizing process. That is, when any one of the third switches SW3 is turned on, it is possible to discharge only the single cell 11 corresponding to the any one of the third switches SW3. Discharging current at this time flows through the resistors R2, R3 and the third switch SW3. Thus, as described above, it is possible to suppress variations in voltage value among the plurality of single cells 11.

The monitoring IC 31 includes comparators 31a. Two input terminals of each comparator 31a are respectively connected to the positive electrode terminal and negative electrode terminal of the corresponding single cell 11 via the corresponding two voltage detection lines L1. Thus, each comparator 31a is able to detect the voltage value of the corresponding single cell 11. In the configuration shown in FIG. 16, when any one of the capacitors C is charged with electric charge in the corresponding single cell 11, the voltage value of the any one of the capacitors C becomes equal to the voltage value of the corresponding single cell 11. The corresponding comparator 31a detects the voltage value of the any one of the capacitors C. An output signal of the comparator 31a is input to the photocoupler 32 (see FIG. 1).

Figure 17:
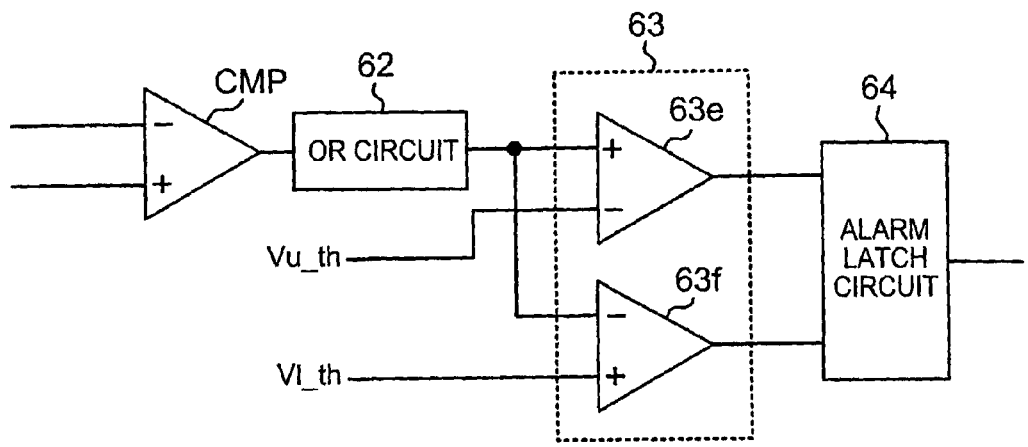
FIG. 17 is a view that shows the configuration of part of a current interruption circuit according to the second embodiment.

On the other hand, the alarm setting circuit 63 in the present embodiment may have the configuration shown in FIG. 17. As shown in FIG. 17, the alarm setting circuit 63 includes a first comparator 63e and a second comparator 63f. The first comparator 63e is used to determine whether any one of the single cells 11 is in the overcharged state. That is, the first comparator 63e is the same as the comparator 63a shown in FIG. 6 or FIG. 7 described in the first embodiment.

The output signal (the voltage value Vb of any one of the single cells 11) of the OR circuit 62 and a threshold Vu_th as a reference voltage are input to the first comparator 63e. The threshold Vu_th is a value for determining whether the single cell 11 is in the overcharged state, and is the same as the threshold V_th (see FIG. 6 or FIG. 7) described in the first embodiment. When the voltage value Vb of any one of the single cells 11 is higher than the threshold Vu_th, the first comparator 63e outputs the alarm signal indicating that the any one of the single cells 11 is in the overcharged state. On the other hand, when the voltage value Vb of each of the single cells 11 is lower than or equal to the threshold Vu_th, the first comparator 63e does not output the alarm signal.

The second comparator 63f is used to determine whether the single cell 11 is in the overdischarged state. Here, the output (the voltage value Vb of any one of the single cells 11) of the OR circuit 62 and a threshold Vl_th as a reference voltage are input to the second comparator 63f. The threshold Vl_th is a value for determining whether any one of the single cells 11 is in the overdischarged state, and may be set as needed. When the voltage value Vb of any one of the single cells 11 is lower than the threshold Vl_th, the second comparator 63f outputs the alarm signal indicating that the any one of the single cells 11 is in the overdischarged state. On the other hand, when the voltage value Vb of each of the single cells 11 is higher than or equal to the threshold Vl_th, the second comparator 63f does not output the alarm signal.

The alarm latch circuit 64 retains the alarm signal output from the first comparator 63e or the second comparator 63f. As described above, in the present embodiment, when any one of the single cells 11 is in the overcharged state or the overdischarged state, the alarm signal is output from the current interruption circuit 60. It is possible to cause the first system main relay SMR-B and the second system main relay SMR-G to switch from the on state to the off state on the basis of the alarm signal.

In the configuration shown in FIG. 16, when any one of the third switches SW3 is turned on in order to execute the equalizing process, the discharging current of the corresponding single cell 11 flows through the any one of the third switches SW3, and is hard to flow through the corresponding capacitor C. Therefore, the voltage value of the corresponding capacitor C becomes lower than the voltage value of the corresponding single cell 11. Each comparator CMP of the current interruption circuit 60 detects the voltage value of the corresponding capacitor C as described with reference to FIG. 5. The voltage value output from each comparator CMP is lower than the voltage value of the corresponding single cell 11, so the voltage value output from each comparator CMP tends to be lower than the threshold Vl_th (see FIG. 17) that is compared in the alarm setting circuit 63.

When the voltage value output from any one of the comparators CMP is lower than the threshold Vl_th, the alarm signal is output from the alarm setting circuit 63 (comparator 63o as described above. It is possible to stop the charging or discharging operation of the battery pack 10 by causing the first system main relay SMR-B and the second system main relay SMR-G to switch from the on state to the off state on the basis of the alarm signal.

When any one of the single cells 11 has reached the overcharged state, the voltage value output from the corresponding comparator CMP becomes higher than the threshold Vu_th, and the alarm signal is output from the alarm setting circuit 63 (comparator 63e). It is possible to stop the charging or discharging operation of the battery pack 10 by causing the first system main relay SMR-B and the second system main relay SMR-G to switch from the on state to the off state on the basis of the alarm signal.

Figure 18:
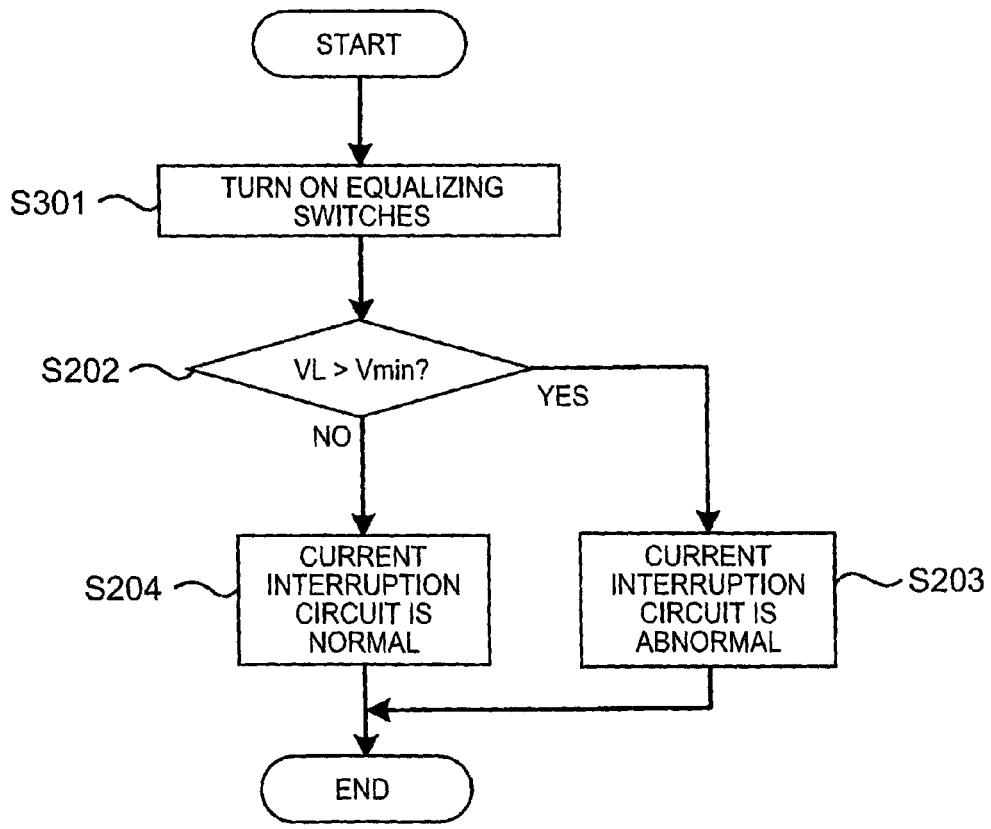
FIG. 18 is a flowchart that shows the process of determining whether the current interruption circuit is in the abnormal state according to the second embodiment.

Next, the process of determining whether the current interruption circuit 60 is in the abnormal state will be described with reference to the flowchart shown in FIG. 18. The process shown in FIG. 18 is executed by the battery ECU 30. Here, in the process shown in FIG. 18, like reference numerals denote the same processes as those described in FIG. 12, and the detailed description is omitted.

In the process shown in FIG. 18, the process of step S301 is executed instead of the process of step S201 shown in FIG. 12. In step S301, the battery ECU 30 causes the third switches SW3, used in the equalizing process, to switch from the off state to the on state.

In the process of step S301, all the third switches SW3 may be caused to switch from the off state to the on state. Thus, current is hard to flow through all the capacitors C shown in FIG. 16, so it is possible to set the voltage value of each capacitor C such that the voltage value of each capacitor C is lower than the voltage value of the corresponding single cell 11. Thus, the voltage values output from all the comparators CMP shown in FIG. 5 are lower than or equal to the threshold Vu_th, and the alarm signal is output from the alarm setting circuit 63 (comparator 63o).

When the alarm signal is output, the charging or discharging operation of the battery pack 10 is stopped, so it is possible to determine whether the current interruption circuit 60 is in the abnormal state by executing the process of step S202.

That is, when the voltage value VL detected by the voltage sensor 24 is lower than or equal to the threshold Vmin, the alarm signal is output from the alarm setting circuit 63, and the battery ECU 30 is allowed to determine that the current interruption circuit 60 is operating normally. In addition, when the voltage value VL is higher than the threshold Vmin, no alarm signal is output from the alarm setting circuit 63, and the battery ECU 30 is allowed to determine that the current interruption circuit 60 is in the abnormal state.

In the process of step S202 shown in FIG. 18, the voltage value VL of the voltage sensor 24 is compared with the threshold Vmin; however, the invention is not limited to this configuration. Specifically, as described with reference to FIG. 13, the current value detected by the current sensor 21 may be compared with the threshold Imin.

According to the present embodiment, even when each single cell 11 is not in the overdischarged state, it is possible to cause the current interruption circuit 60 to determine that any one of the single cells 11 is in the overdischarged state on the basis of the command output from the battery ECU 30. In other words, even when each single cell 11 is not in the overdischarged state, it is possible to cause the current interruption circuit 60 to output the alarm signal. Thus, it is possible to check whether the alarm signal is normally output from the current interruption circuit 60, and it is possible to determine whether the current interruption circuit 60 is in the abnormal state.

As described above, according to an aspect of the invention, an electrical storage system includes an electrical storage device in which a plurality of electrical storage blocks are connected in series with each other, a relay, a controller and a current interruption circuit. The relay switches between an on state where the relay connects the electrical storage device to a load and an off state where the relay interrupts connection of the electrical storage device with the load. The controller controls the relay so as to cause the relay to switch between an on state and an off state. The current interruption circuit interrupts energization of the electrical storage blocks by causing the relay to switch from the on state to the off state.

The current interruption circuit includes an alarm circuit, a latch circuit and a transistor. The alarm circuit outputs an alarm signal indicating that any one of the electrical storage blocks is in an overcharged state or an overdischarged state by comparing an input voltage value of each electrical storage block with a threshold. The latch circuit retains the alarm signal and outputs the retained signal. The transistor causes the relay to switch from the on state to the off state upon reception of an output signal of the latch circuit. The controller determines an energization state of the electrical storage device after control for causing the alarm circuit to output the alarm signal is executed by changing one of the voltage value and the threshold, input to the alarm circuit.

Each electrical storage block may be formed of at least one electrical storage element that is charged or discharged. Specifically, each electrical storage block may be formed of a single electrical storage element or may be formed of a plurality of electrical storage elements. When each electrical storage block is formed of a plurality of electrical storage elements, the plurality of electrical storage elements may be connected in series with each other or connected in parallel with each other.

With the above configuration, the controller is able to cause the relay to switch between the on state and the off state by outputting a control signal. In addition, with the above configuration, it is possible to cause the relay to switch from the on state to the off state with the use of the current interruption circuit through a line different from a line through which the controller controls the relay.

That is, the current interruption circuit is able to cause the relay to switch from the on state to the off state independently of control executed by the controller. Therefore, even when a program (microcomputer) included in the controller is changed, it is possible to cause the relay to switch from the on state to the off state with the use of the current interruption circuit when any one of the electrical storage blocks is in an overcharged state or overdischarged state. In this way, irrespective of the controller, it is possible to continuously use the current interruption circuit, and it is possible to improve the general versatility of the current interruption circuit.

The operation of the current interruption circuit does not include program processing, so it is possible to cause the relay to switch from the on state to the off state without taking a bug of a program into consideration. Electrical elements included in the current interruption circuit may be formed of semiconductor elements of which abrasion degradation (aged degradation) is hard to advance, so it is possible to improve the reliability of the component.

Furthermore, with the above configuration, even when each of the electrical storage blocks is not in an overcharged state or overdischarged state, it is possible to cause the current interruption circuit (alarm circuit) to output the alarm signal through control executed by the controller. Here, when the current interruption circuit is operating normally, it is possible to cause the relay to switch from the on state to the off state in response to the alarm signal, so it is possible to interrupt energization of the electrical storage device. On the other hand, when the current interruption circuit is not operating normally, no alarm signal is output, so it is not possible to cause the relay to switch from the on state to the off state. Accordingly, it is not possible to interrupt energization of the electrical storage device.

Therefore, the controller is able to determine whether the current interruption circuit is operating normally when it is determined whether the electrical storage device is in an energized state or a non-energized state after control for outputting the alarm signal is executed. Specifically, when the electrical storage device remains in the energized state after control for outputting the alarm signal is executed, the controller may determine that the current interruption circuit is in the abnormal state. In addition, when the electrical storage device becomes the non-energized state after control for outputting the alarm signal is executed, the controller may determine that the current interruption circuit is in the normal state.

Here, it is possible to determine whether the electrical storage device is in the energized state or the non-energized state with the use of a voltage sensor that detects a voltage value of the electrical storage device or a current sensor that detects a current value of the electrical storage device. When the electrical storage device is connected to the load and is in the energized state, the voltage value of the electrical storage device is detected by the voltage sensor or current flowing through the electrical storage device is detected by the current sensor.

On the other hand, when the electrical storage device is not connected to the load and is in the non-energized state, the voltage value of the electrical storage device is not detected by the voltage sensor or current flowing through the electrical storage device is not detected by the current sensor. Therefore, the controller is able to determine whether the electrical storage device is in the energized state or the non-energized state on the basis of an output of one of the voltage sensor and the current sensor.

A capacitor may be connected in parallel with each of the electrical storage blocks. Thus, each capacitor may be charged with electric charge in a corresponding one of the electrical storage blocks, and a voltage value of each capacitor may be output to the alarm circuit as a voltage value of the corresponding one of the electrical storage blocks. In the configuration in which the capacitors are provided, a first switch that connects each electrical storage block with a corresponding one of the capacitors and a bypass circuit connecting in parallel with the corresponding one of the capacitors and each including a second switch. Here, a multiplexer may be used as the first switches.

When the first switches and the second switches are driven; it is possible to charge the single capacitor with an output of a plurality of the electrical storage blocks. Specifically, when the specified first switches and the specified second switch are turned on, it is possible to form a current path that allows the single capacitor to be charged with electric charge in a plurality of the electrical storage blocks.

Thus, the voltage value of the capacitor becomes higher than the voltage value of the electrical storage block connected in parallel with the capacitor, and the voltage value input to the alarm circuit becomes higher than a threshold. The threshold may be a value by which it is determined whether any one of the electrical storage blocks is in an overcharged state. Accordingly, the alarm circuit may output an alarm signal indicating that any one of the electrical storage blocks is in the overcharged state.

That is, even when each electrical storage block is not actually in the overcharged state, the controller is able to cause the alarm circuit to output the alarm signal by controlling the first switches and the second switches. As described above, it is possible to determine whether the current interruption circuit is in the abnormal state on the basis of whether the electrical storage device is in the energized state or the non-energized state.

On the other hand, a discharge circuit may be connected in parallel with the electrical storage blocks. Specifically, the discharge circuit may be connected in parallel with the electrical storage blocks via corresponding lines branched off from lines that connect the corresponding electrical storage blocks to the current interruption circuit. The discharge circuit may include third switches. By operating any one of the third switches, it is possible to cause discharge current to flow to the discharge circuit by discharging a corresponding one of the electrical storage blocks. Here, the controller may cause each of the third switches included in the discharge circuit to switch between an on state and an off state.

When current is caused to flow from any one of the electrical storage blocks to the discharge circuit, the voltage value input to the alarm circuit decreases, and the voltage value input to the alarm circuit becomes lower than a threshold. The threshold may be a value by which it is determined whether any one of the electrical storage blocks is in an overdischarged state. Accordingly, the alarm circuit may output an alarm signal indicating that any one of the electrical storage blocks is in the overdischarged state.

That is, even when each electrical storage block is not actually in the overdischarged state, the controller is able to cause the alarm circuit to output the alarm signal. As described above, it is possible to determine whether the current interruption circuit is in the abnormal state on the basis of whether the electrical storage device is in the energized state or the non-energized state.

A capacitor may be connected in parallel with each of the electrical storage blocks. Thus, each capacitor may be charged with electric charge in a corresponding one of the electrical storage blocks, and a voltage value of each capacitor may be output to the alarm circuit as a voltage value of the corresponding one of the electrical storage blocks. A discharge circuit may be connected in parallel with the capacitors.

As described above, when current is caused to flow from any one of the electrical storage blocks to the discharge circuit, a corresponding one of the capacitors is hard to be charged with electric charge in the corresponding electrical storage block, so it is possible to decrease the voltage value of the corresponding one of the capacitors such that the voltage value of the corresponding one of the capacitors is lower than the voltage value of the electrical storage block connected in parallel with the corresponding one of the capacitors. Thus, it is possible to set the voltage value input to the alarm circuit such that the input voltage value is lower than the threshold, and it is possible to cause the current interruption circuit (alarm circuit) to output the alarm signal indicating the overdischarged state.

The invention claimed is:

1. An electrical storage system comprising:
an electrical storage device in which a plurality of electrical storage blocks are connected in series with each other, each of the plurality of electrical storage blocks including at least one electrical storage element configured to be charged or discharged;
a plurality of capacitors each connected in parallel with a corresponding one of the electrical storage blocks and each configured to output a voltage value of the corresponding one of the electrical storage blocks;
a relay configured to switch between an on state where the relay connects the electrical storage device to a load and an off state where the relay interrupts connection of the electrical storage device with the load;
a controller configured to control the relay so as to cause the relay to switch between the on or off state; and
a current interruption circuit configured to interrupt energization of the electrical storage device by causing the relay to switch from the on state to the off state, wherein:
the current interruption circuit includes
an alarm circuit configured to output an alarm signal indicating that at least any one of the electrical storage blocks is in an overcharged state by comparing an input voltage value of each electrical storage block input from the capacitors with a threshold,
a latch circuit configured to retain the alarm signal; and
a transistor configured to cause the relay to switch from the on state to the off state upon reception of an output signal of the latch circuit, and
the controller is configured to execute control for causing the alarm circuit to output the alarm signal by charging one of the capacitors using an output of a plurality of the electrical storage blocks and then determine an energization state of the electrical storage device, the alarm signal indicating that at least any one of the electrical storage blocks is in an overcharged state.

2. The electrical storage system according to claim 1, wherein when the electrical storage device is in an energized state after control for outputting the alarm signal is executed, the controller is configured to determine that the current interruption circuit is in an abnormal state.

3. The electrical storage system according to claim 1, wherein when the electrical storage device is in a non-energized state after control for outputting the alarm signal is executed, the controller is configured to determine that the current interruption circuit is in a normal state.

4. The electrical storage system according to claim 1, characterized in that
the controller is configured to determine the energization state of the electrical storage device using at least one of an output of a voltage sensor configured to detect a voltage value of the electrical storage device and an output of a current sensor configured to detect a current value of the electrical storage device.

5. The electrical storage system according to claim 1, characterized by further comprising:
a plurality of first switches each of which connects a corresponding one of the electrical storage blocks to a corresponding one of the capacitors; and
a plurality of bypass circuits each connected in parallel with a corresponding one of the capacitors and each including a second switch, wherein
the controller is configured to charge one of the capacitors using an output of a plurality of the electrical storage blocks through drive control over the first switches and the second switches.

6. An electrical storage system comprising:
an electrical storage device in which a plurality of electrical storage blocks are connected in series with each other, each of the plurality of electrical storage blocks including at least one electrical storage element configured to be charged or discharged;
a relay configured to switch between an on state where the relay connects the electrical storage device to a load and an off state where the relay interrupts connection of the electrical storage device with the load;

a controller configured to control the relay so as to cause the relay to switch between the on or off state; and a current interruption circuit configured to interrupt energization of the electrical storage device by causing the relay to switch from the on state to the off state; wherein the current interruption circuit includes
- an alarm circuit configured to output an alarm signal indicating that at least any one of the electrical storage blocks is in an overdischarged state by comparing an input voltage value of each electrical storage block with a threshold,
- a latch circuit configured to retain the alarm signal; and
- a transistor configured to cause the relay to switch from the on state to the off state upon reception of an output signal of the latch circuit, the electrical storage system further comprising:

a discharge circuit connected in parallel with the electrical storage blocks via corresponding lines branched off from lines that connect the corresponding electrical storage blocks to the current interruption circuit, and configured to discharge each of the electrical storage blocks by operating a corresponding one of third switches, wherein the controller is configured to execute control for outputting the alarm signal indicating the overdischarged state by decreasing the voltage value input to the alarm circuit by allowing any one of the electrical storage blocks to be discharged to the discharge circuit through drive control over the corresponding third switch of the discharge circuit, and then determine an energization state of the electrical storage device.

7. The electrical storage system according to claim 6, further comprising:

a plurality of capacitors each connected in parallel with a corresponding one of the electrical storage blocks and each configured to output the voltage value of the corresponding one of the electrical storage blocks to the alarm circuit, wherein the discharge circuit is connected in parallel with the capacitors.

* * * * *